US009167405B2

(12) United States Patent
Sanjeev et al.

(10) Patent No.: US 9,167,405 B2
(45) Date of Patent: Oct. 20, 2015

(54) NETWORK BILLING OF TEXT MESSAGES SENT/RECEIVED BY FIXED USER DEVICES

(71) Applicant: Cellco Partnership, Basking Ridge, NJ (US)

(72) Inventors: Kumar Sanjeev, San Ramon, CA (US); Zhijian Lin, Dublin, CA (US); Wei Guang Tan, San Jose, CA (US); Seng Kin Liew, Johns Creek, GA (US)

(73) Assignee: Cellco Partnership, Basking Ridge, NJ (US)

( * ) Notice: Subject to any disclaimer, the term of this patent is extended or adjusted under 35 U.S.C. 154(b) by 39 days.

(21) Appl. No.: 14/041,216

(22) Filed: Sep. 30, 2013

(65) Prior Publication Data

US 2015/0094018 A1  Apr. 2, 2015

(51) Int. Cl.
*H04W 4/24* (2009.01)
*H04W 4/12* (2009.01)

(52) U.S. Cl.
CPC ..................... *H04W 4/24* (2013.01)

(58) Field of Classification Search
CPC .......... H04W 4/24; H04W 4/26; H04W 4/12; H04W 4/14; H04W 90/08; H04M 15/41; H04M 15/42; H04M 15/46; H04M 15/52; H04M 15/67; H04M 2215/0164; H04M 2215/22; H04M 2215/24; H04M 2215/28; H04M 2215/32; H04M 2215/52; H04M 2215/64; H04M 2215/54; H04M 2215/68; H04M 2215/62; H04M 3/42382; H04M 7/0048; H04M 17/206; H04M 2017/243; H04M 15/08; H04L 1/189
USPC .............. 455/405–411, 465–466, 517, 550.1, 455/556.1–556.2, 557, 560–561; 379/126, 379/127.01
See application file for complete search history.

(56) References Cited

U.S. PATENT DOCUMENTS

| | | | |
|---|---|---|---|
| 6,173,171 B1 * | 1/2001 | Plush et al. | 455/408 |
| 7,366,530 B2 * | 4/2008 | McCann et al. | 455/466 |
| 2002/0188562 A1 * | 12/2002 | Igarashi et al. | 705/40 |
| 2004/0176067 A1 * | 9/2004 | Lakhani et al. | 455/406 |
| 2005/0143106 A1 * | 6/2005 | Chan et al. | 455/466 |
| 2006/0041505 A1 * | 2/2006 | Enyart | 705/40 |
| 2008/0014971 A1 * | 1/2008 | Morin et al. | 455/466 |
| 2008/0243619 A1 * | 10/2008 | Sharman et al. | 705/14 |
| 2009/0129372 A1 * | 5/2009 | Pandey et al. | 370/352 |
| 2009/0176478 A1 * | 7/2009 | Mumick | 455/406 |
| 2010/0035576 A1 * | 2/2010 | Jones et al. | 455/406 |
| 2010/0113074 A1 * | 5/2010 | Sheppard | 455/466 |

\* cited by examiner

*Primary Examiner* — Meless Zewdu

(57) ABSTRACT

A device receives a message from a fixed user device associated with a first user. The first user is associated with a first mobile user device, and the message is destined for a second mobile user device associated with a second user. The device generates a first charge record for the first user based on the message and on a telephone number associated with the first mobile user device, and provides the first charge record to a billing system. The device generates a copy of the message, provides the copy of the message to the first mobile user device, and forwards the message toward the second mobile user device.

20 Claims, 21 Drawing Sheets

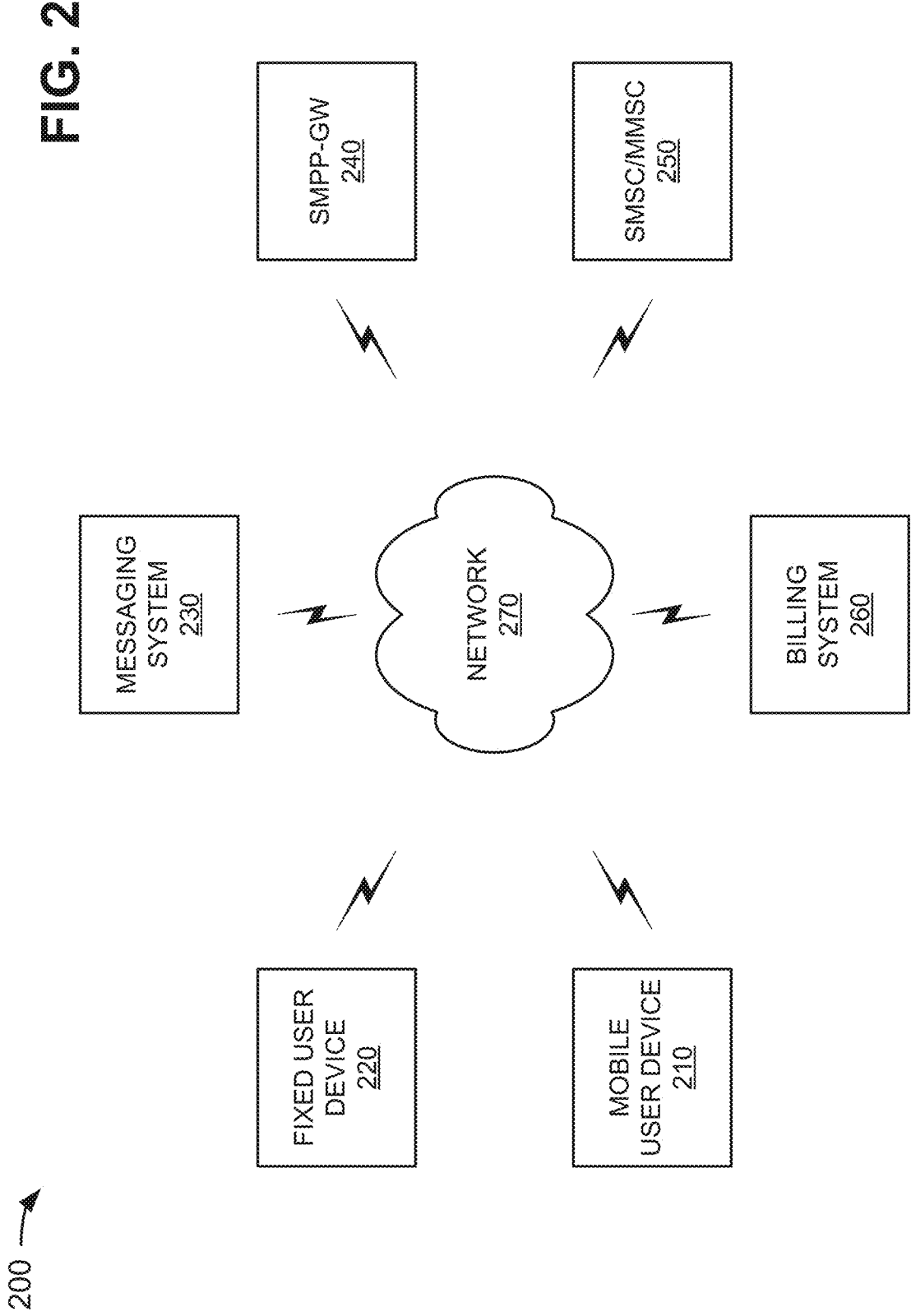

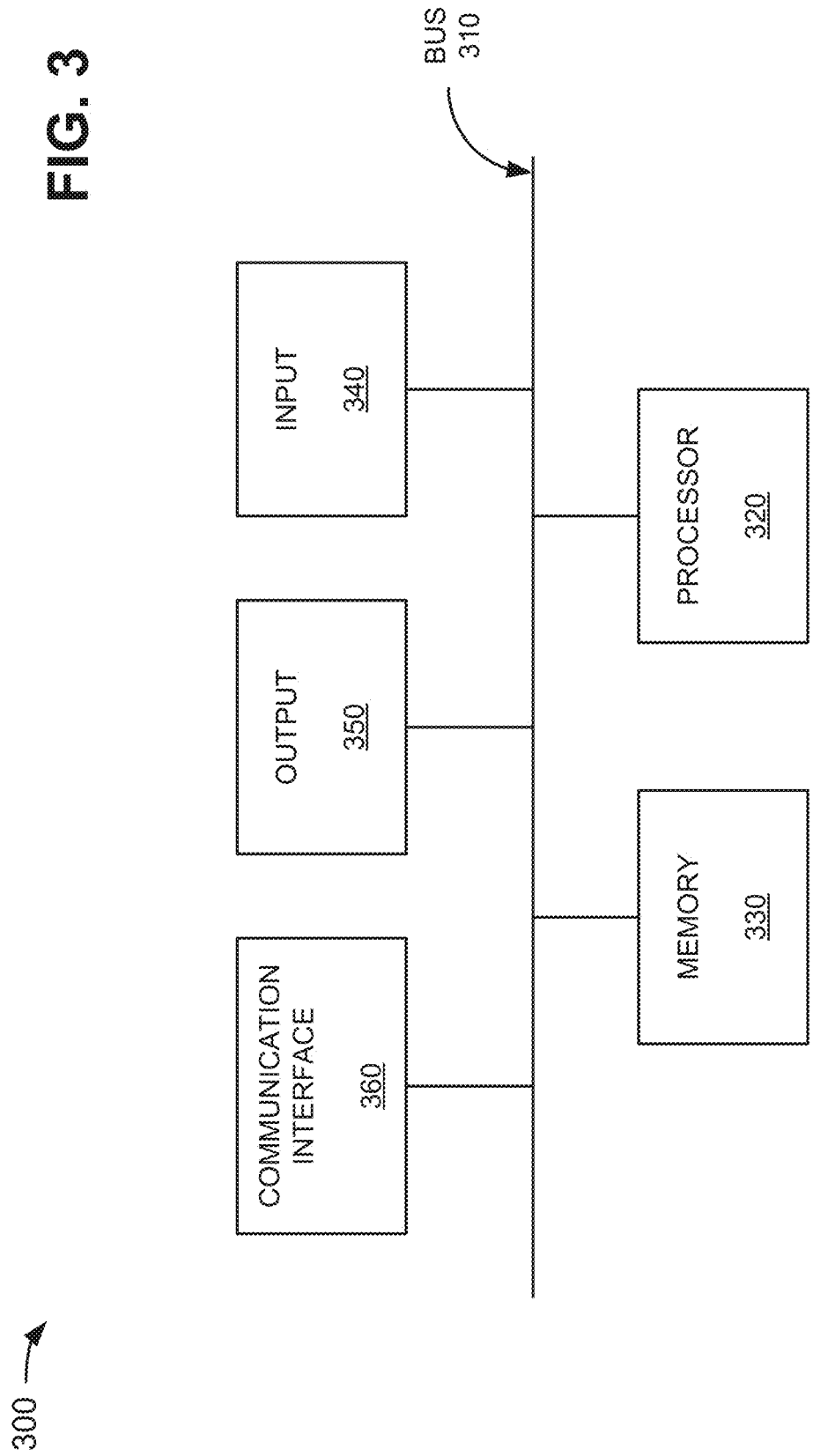

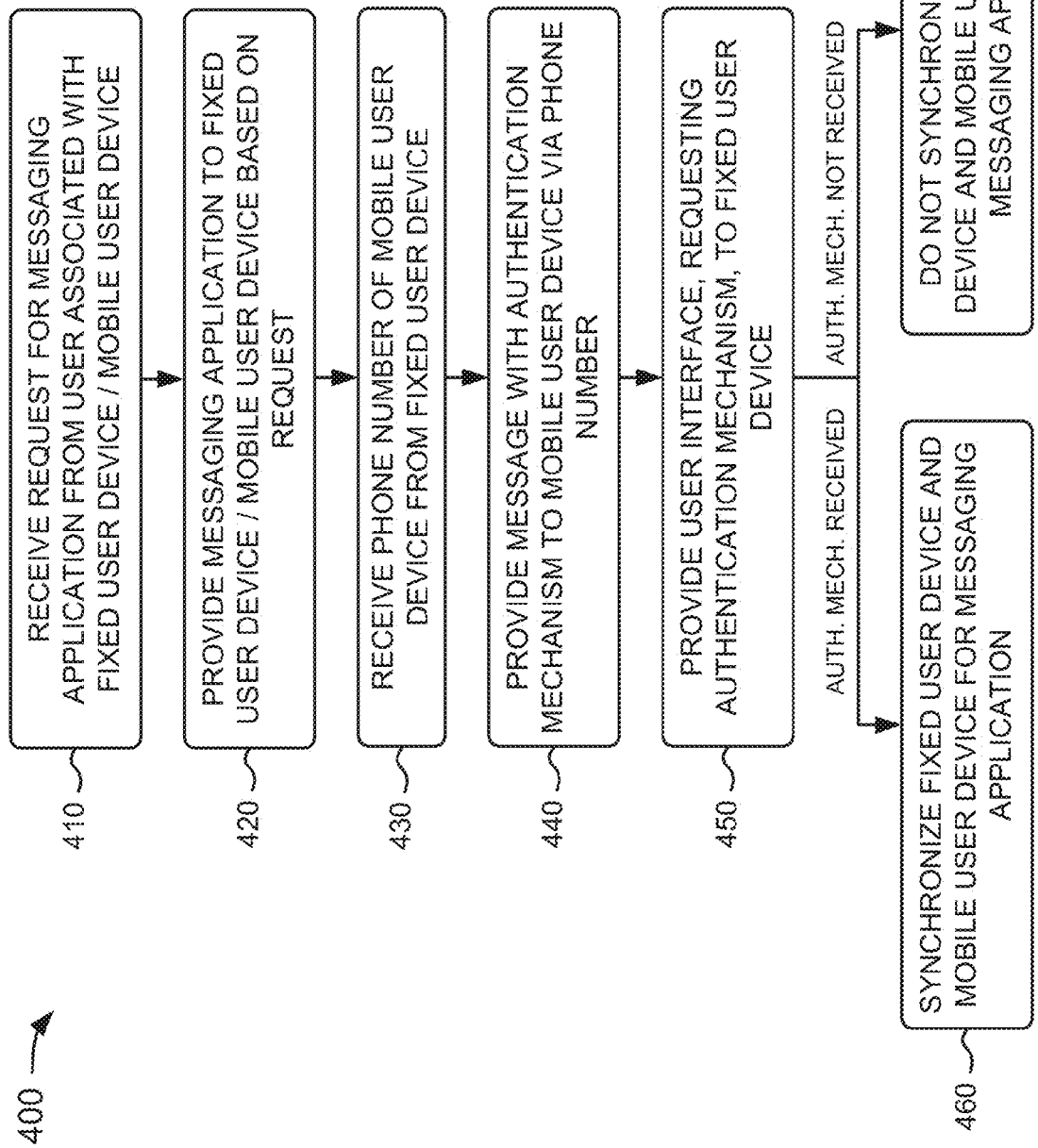

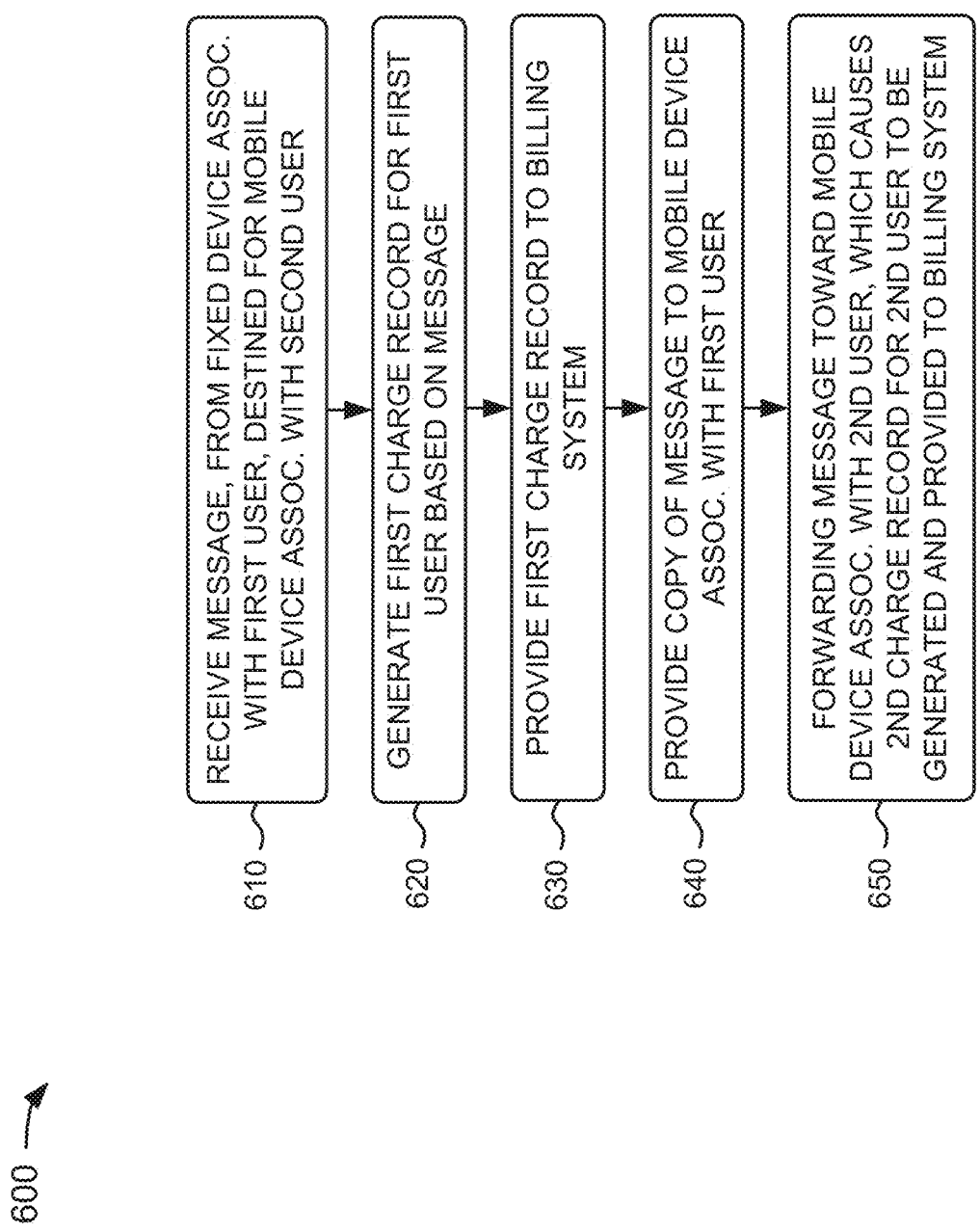

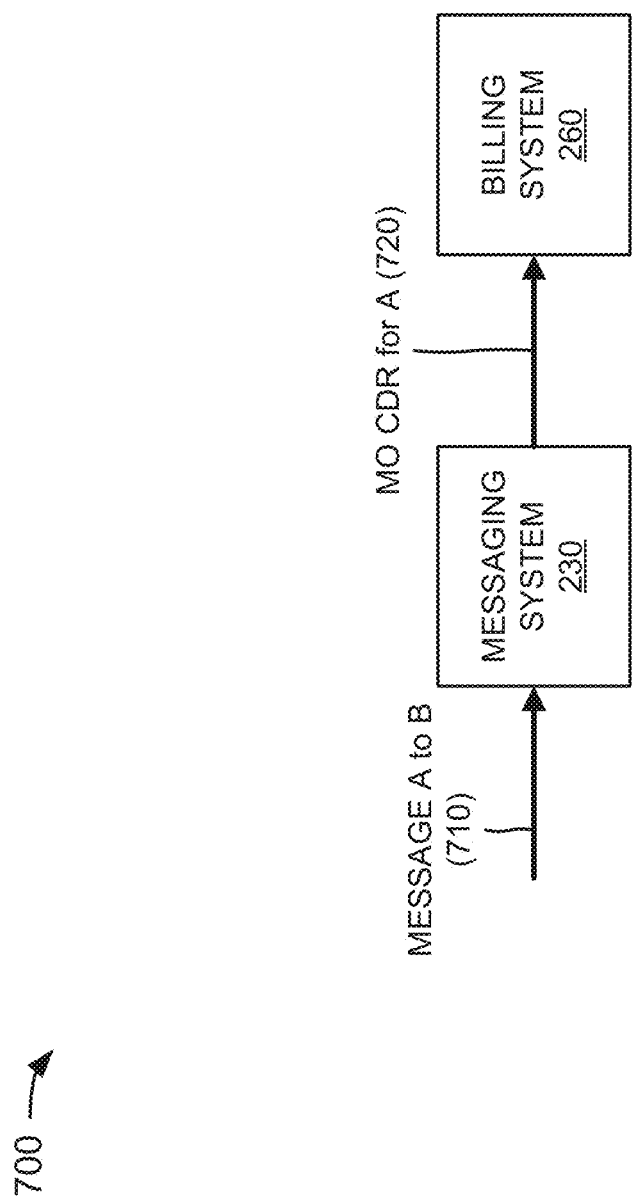

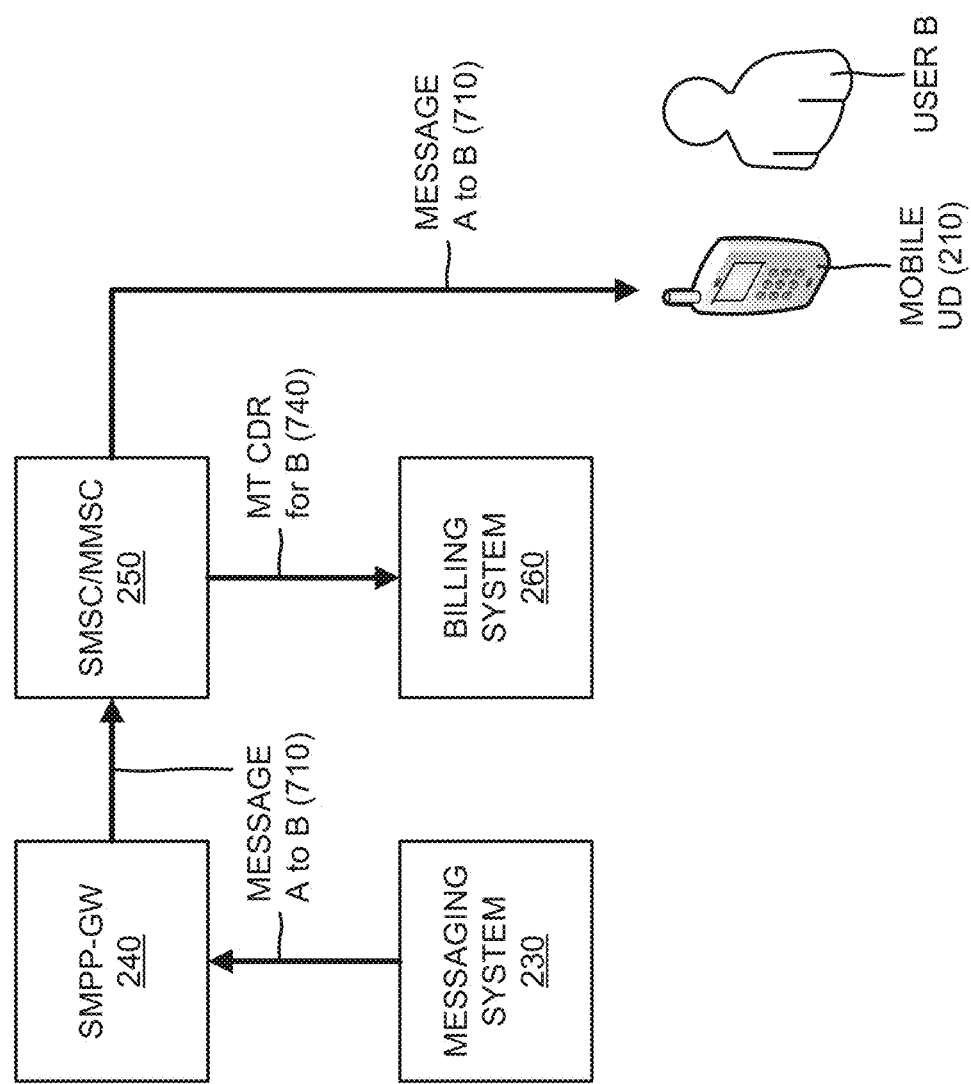

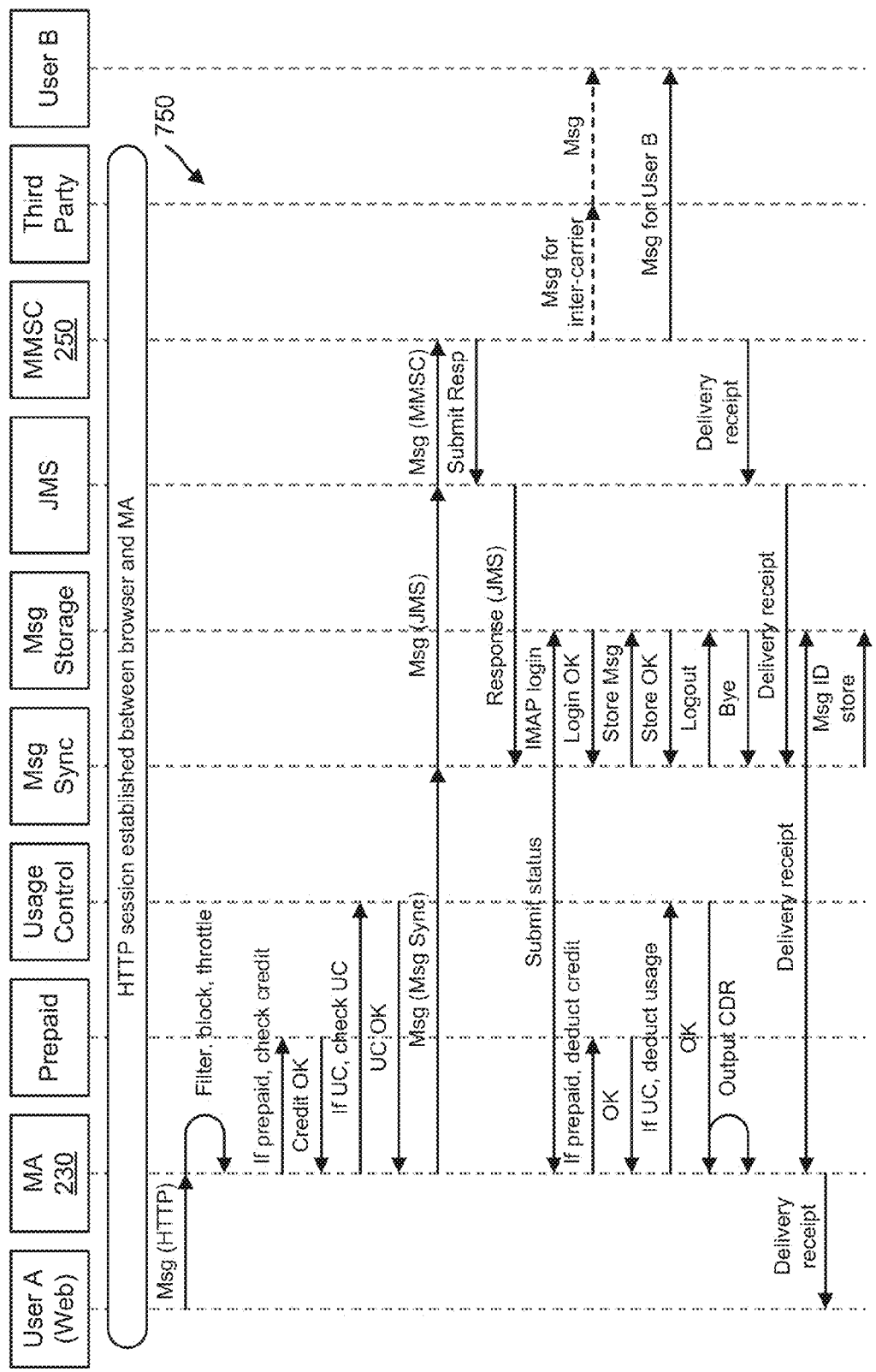

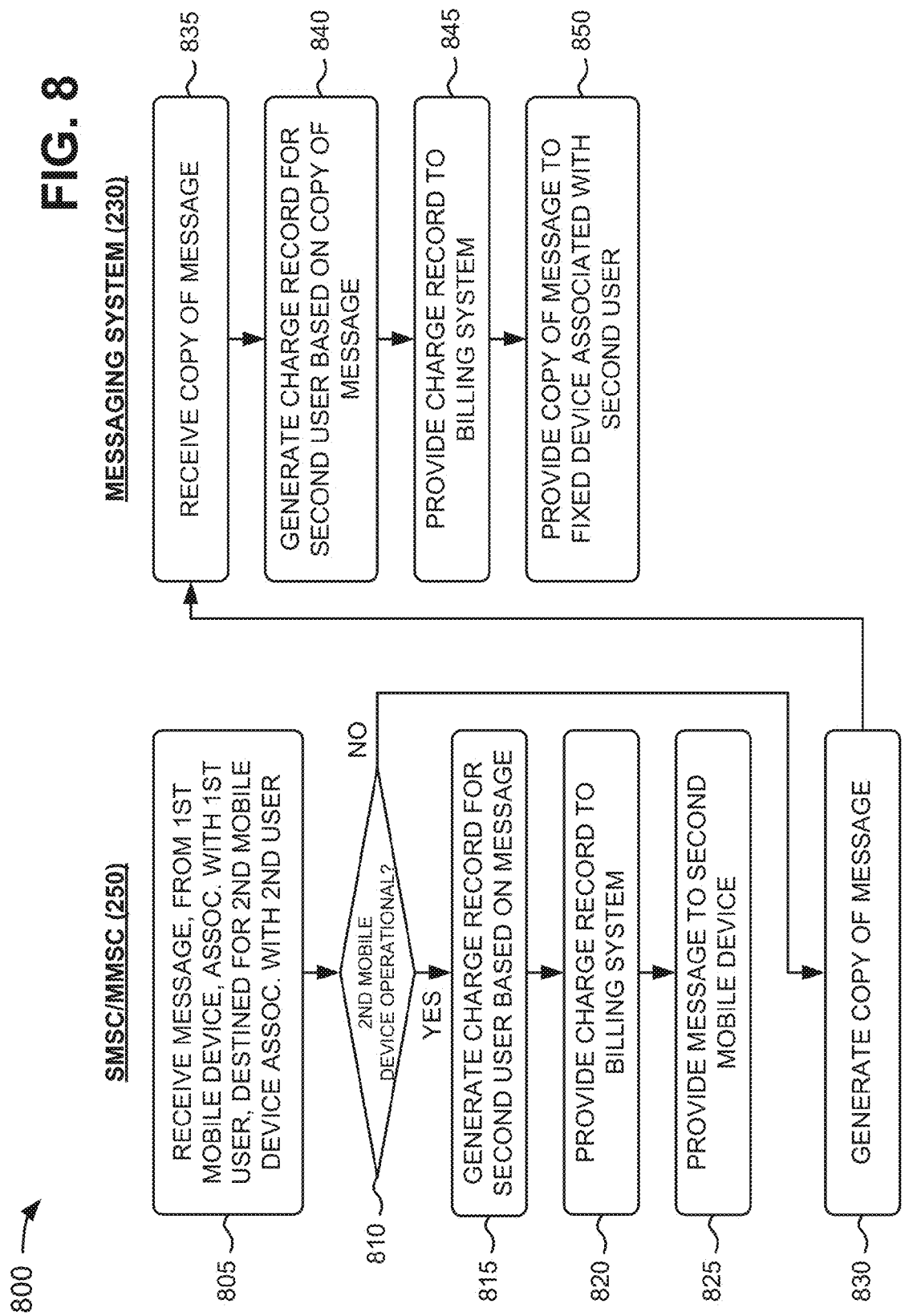

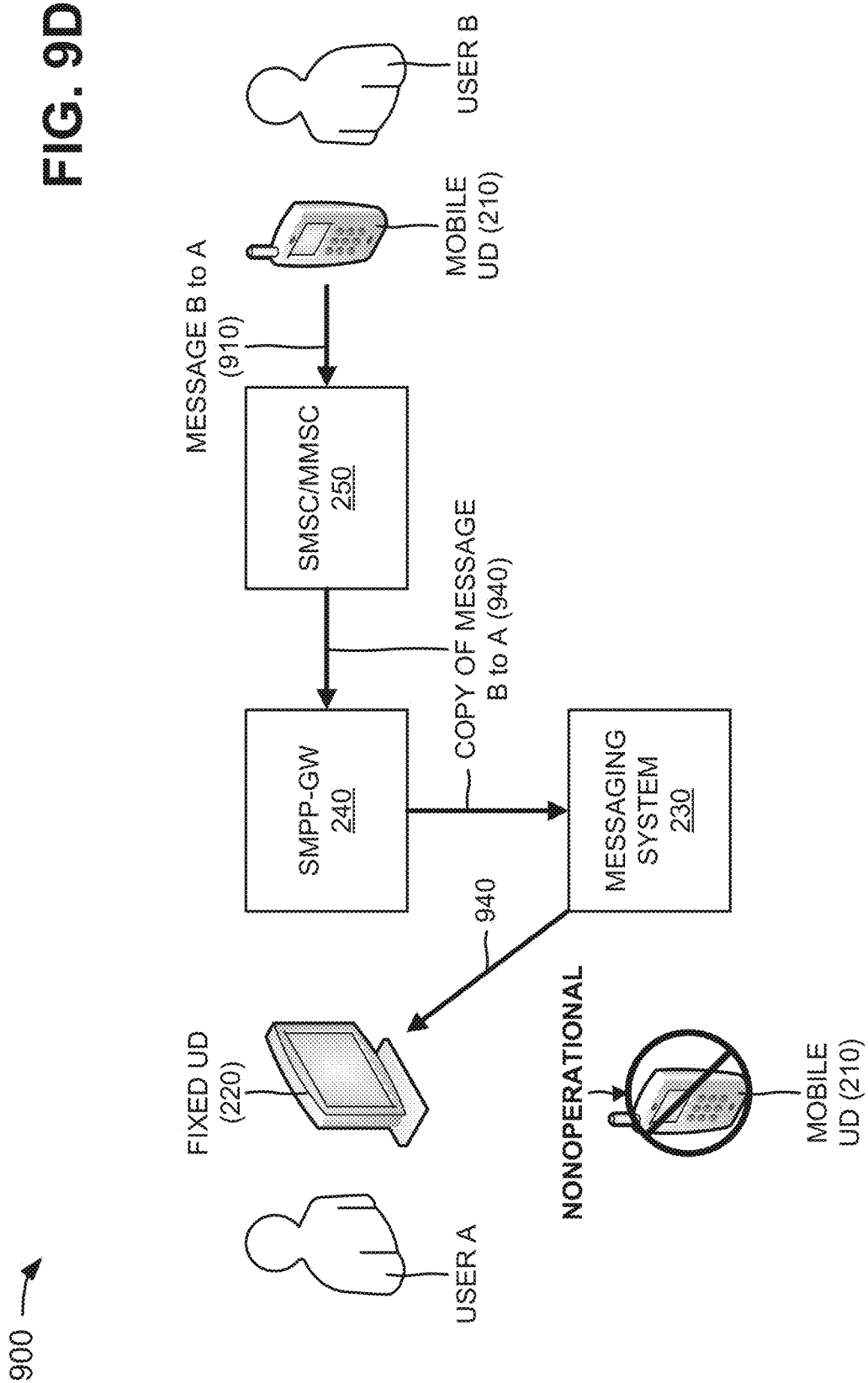

NETWORK BILLING OF TEXT MESSAGES SENT/RECEIVED BY FIXED USER DEVICES

BACKGROUND

Users may utilize mobile user devices or fixed user devices to communicate with one another. A mobile user device may include a mobile computation and communication device, such as a radiotelephone, a personal communications system (PCS) terminal, a personal digital assistant (PDA), a smart phone, a laptop computer (e.g., with a wireless card), etc. A fixed user device may include a fixed (e.g., provided in a particular location, such as within a user's home) computation and communication device, such as a laptop computer, a personal computer, a tablet computer, a set-top box (STB), a television, a gaming system, etc.

In some instances, users may utilize such fixed or mobile user devices to exchange Short Message Service (SMS) or text messages. In one example, two users may exchange text messages with one another via mobile user devices, and both users may be billed for the text messages by a telecommunications provider. In another example, a first user may utilize a fixed user device to send a text message to a second user's mobile user device. The second user may utilize the mobile user device to send a text message to the first user's fixed user device. In this example, the telecommunications provider may bill the second user for sending or receiving text messages via the mobile user device. However, the telecommunications provider is unable to bill the first user for sending or receiving text messages via the fixed user device.

BRIEF DESCRIPTION OF THE DRAWINGS

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for synchronizing execution of a text messaging application in a fixed user device and a mobile user device;

FIG. 6 is a flow chart of an example process for charging for a text message sent by a fixed user device;

FIGS. 7A-7F are diagrams of an example relating to the example process shown in FIG. 6;

FIG. 8 is a flow chart of an example process for charging for a text message received by a fixed user device; and FIGS. 9A-9D are diagrams of an example relating to the example process shown in FIG. 8.

DETAILED DESCRIPTION OF PREFERRED EMBODIMENTS

The following detailed description refers to the accompanying drawings. The same reference numbers in different drawings may identify the same or similar elements.

Figure 1A:
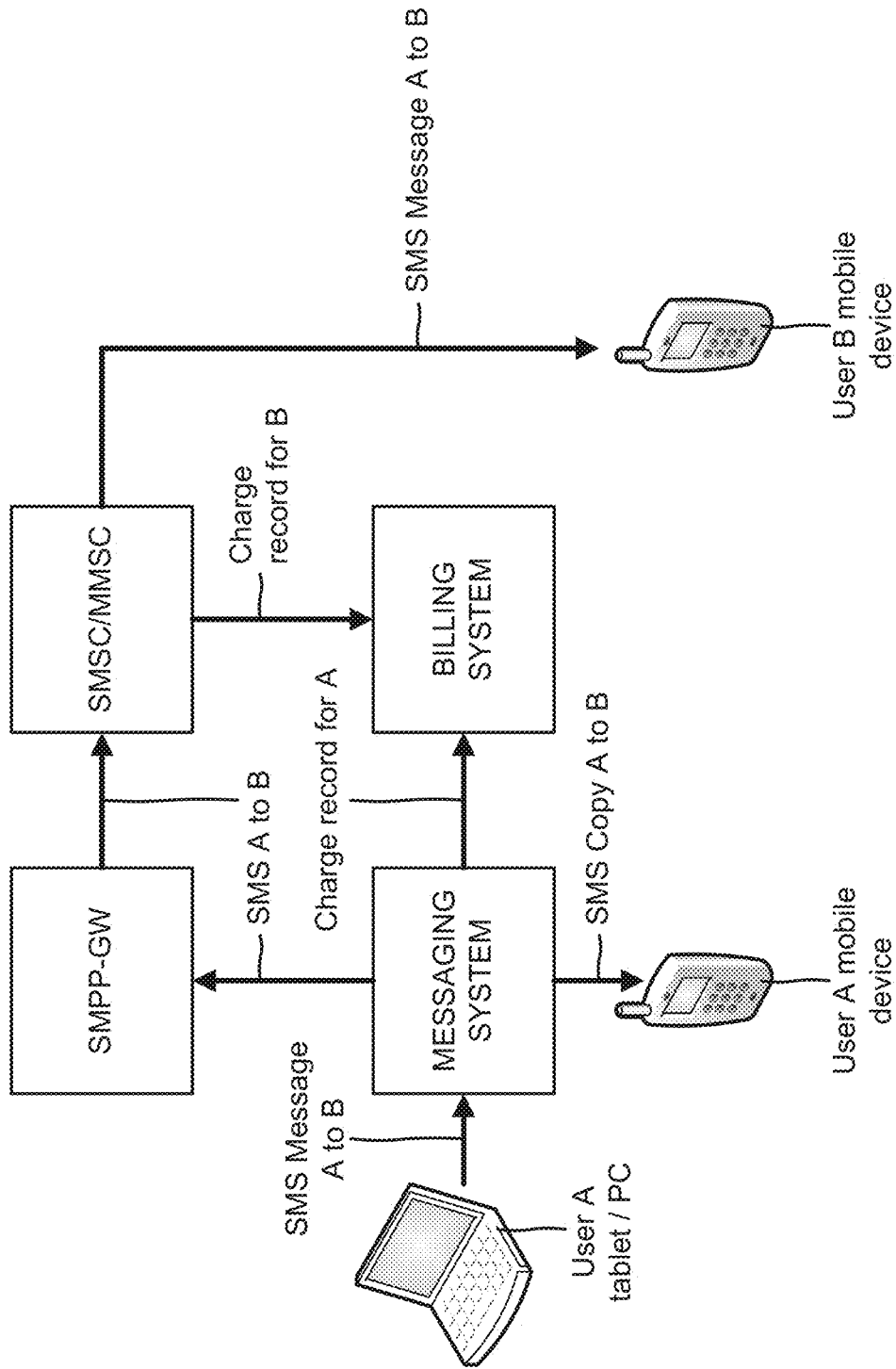
FIGS. 1A and 1B are diagrams of an overview of an example implementation described herein.
Figure 1B:
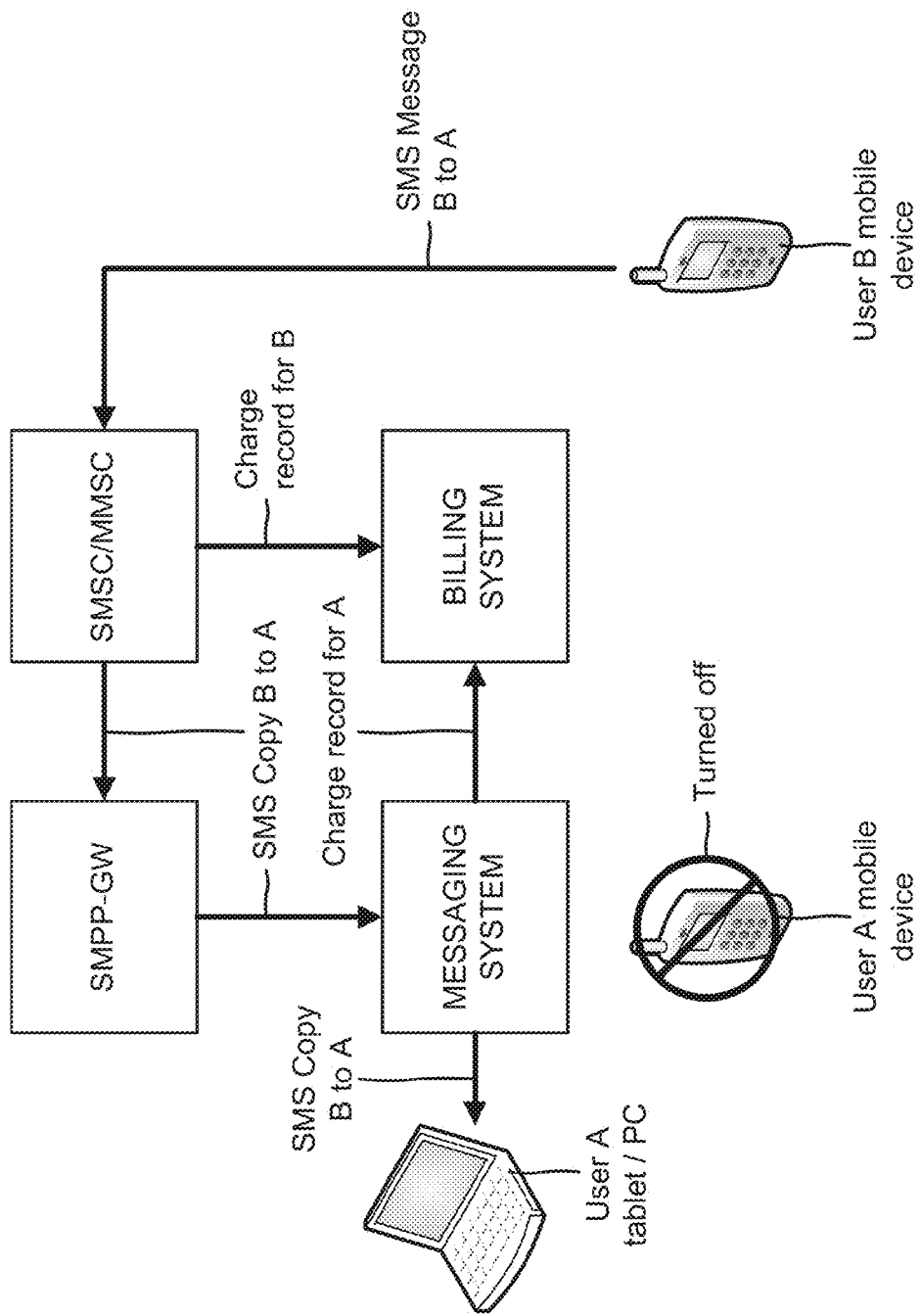

FIGS. 1A and 1B are diagrams of an overview of an example implementation 100 described herein. As shown in FIG. 1A, a fixed user device, mobile user devices, a messaging system, a short message peer-to-peer gateway (SMPP-GW), a short message service center/multimedia message service center (SMSC/MMSC), and a billing system may be connected together via network (not shown in FIGS. 1A and 1B). The fixed user device may include a tablet computer, a personal computer (PC), etc. Each mobile user device may include radiotelephone, a PCS terminal, a smart phone, a PDA, etc. The fixed user device and one mobile user device may be associated with a first user (e.g., User A) and the other mobile user device may be associated with a second user (e.g., User B). The messaging system may include one or more computation and communication devices that enable billing of SMS or text messages sent from or received by the fixed user device.

The SMPP-GW may include a network device (e.g., a gateway, a router, a switch, etc.) that allows text messages to be sent from and received by email, web pages, or other software applications. The SMPP-GW may convert a text message into a format that is understood by the SMSC/MMSC. The SMSC/MMSC may include one or more computation and communication devices that store, forward, convert, and deliver SMS messages or Multimedia Messaging Service (MMS) messages. The billing system may include one or more computation and communication devices that receive charge records associated with text messages, and generate bills based on the charge records.

In example implementation 100, assume that User A wishes to provide a SMS message to User B via the fixed user device. Further, assume that User A utilizes the fixed user device to generate a SMS message addressed to the mobile user device associated with User B. The fixed user device may provide the SMS message (e.g., SMS Message A to B) to the messaging system, and the messaging system may receive the SMS message, as shown in FIG. 1A. The messaging system may generate a charge record (e.g., a call data record (CDR)) for User A based on the SMS message, and may provide the charge record to the billing system. The billing system may receive the charge record for User A, and may bill User A for the SMS message based on the charge record. The messaging system may generate a copy of the SMS message, and may provide the copy of the SMS message to the mobile user device associated with User A, as further shown in FIG. 1A. This may enable User A to have access to text messages sent or received by User A via the fixed user device and the mobile user device.

As further shown in FIG. 1A, the messaging system may forward the SMS message to the SMPP-GW, and the SMPP-GW may receive the SMS message. The SMPP-GW may convert the SMS message into a format understood by the SMSC/MMSC, and may provide the converted SMS message to the SMSC/MMSC. The SMSC/MMSC may generate a charge record (e.g., a CDR) for User B based on the SMS message, and may provide the charge record to the billing system. The billing system may receive the charge record for User B, and may bill User B for the SMS message based on the charge record. The SMSC/MMSC may provide the SMS message to the mobile user device associated with User B, and the mobile user device may receive the SMS message and display the SMS message to User B.

With reference to FIG. 1B, now assume that User B wishes to provide a SMS message to the mobile user device associated with User A. Further, assume that the mobile user device associated with User A is turned off. User B may utilize the mobile user device, associated with User B, to generate a SMS message addressed to the mobile user device associated with User A. User B's mobile user device may provide the SMS message (e.g., SMS Message B to A) to the SMSC/MMSC, and the SMSC/MMSC may receive the SMS message. The SMSC/MMSC may generate a charge record (e.g., a CDR) for User B based on the SMS message, and may provide the charge record to the billing system. The billing system may receive the charge record for User B, and may bill User B for the SMS message based on the charge record.

The SMSC/MMSC may determine that the SMS message cannot be provided to User A's mobile user device since User A's mobile user device is turned off. Based on this determination, the SMSC/MMSC may generate a copy of the SMS message, and may provide the copy of the SMS message to the SMPP-GW, as further shown in FIG. 1B. The SMPP-GW may receive the copy of the SMS message, and may forward the copy of the SMS message to the messaging system. The messaging system may receive the copy of the SMS message, and may provide the copy of the SMS message to the fixed user device associated with User A, as further shown in FIG. 1B. The messaging system may generate a charge record (e.g., a CDR) for User A based on the copy of the SMS message, and may provide the charge record to the billing system. The billing system may receive the charge record for User A, and may bill User A for the SMS message based on the charge record.

Such an arrangement may enable a telecommunications provider to charge a user for sending or receiving text messages via a fixed user device. The messaging system of the arrangement may generate a charge record (e.g., a CDR), for the user, every time that a text message is generated or received by a fixed user device, such as tablet computer or a PC provided in a particular location (e.g., at home, work, etc.). The messaging system may provide the charge record to the billing system so that the billing system (e.g., associated with a telecommunications provider) may bill the user.

FIG. 2 is a diagram of an example environment 200 in which systems and/or methods described herein may be implemented. As illustrated, environment 200 may include a mobile user device 210, a fixed user device 220, a messaging system device 220 (referred to herein as "messaging system 230"), a SMPP-GW 240, a SMSC/MMSC 250, a billing system 260, and a network 270. Devices/networks of environment 200 may interconnect via wired and/or wireless connections.

Mobile user device 210 may include a device that is capable of communicating over network 270 with messaging system 230, SMPP-GW 240, SMSC/MMSC 250, and/or billing system 260. In some implementations, mobile user device 210 may include a mobile computation and communication device, such as a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer (e.g., with a wireless card); a tablet computer; or other types of mobile computation and communication devices. In some implementations, mobile user device 210 may send or receive a text message, such as a SMS message or a MMS message.

Fixed user device 220 may include a device that is capable of communicating over network 270 with messaging system 230, SMPP-GW 240, SMSC/MMSC 250, and/or billing system 260. In some implementations, fixed user device 220 may include a fixed (e.g., provided in a particular location, such as within a user's home) computation and communication device, such as a laptop computer, a personal computer, a tablet computer, a set-top box (STB), a television, a gaming system, or other types of fixed computation and communication devices. In some implementations, fixed user device 220 may send or receive a text message, such as a SMS message or a MMS message.

Messaging system 230 may include one or more personal computers, workstation computers, server devices, or other types of computation and communication devices. In some implementations, messaging system 230 may enable a user of fixed user device 220 to be charged when text messages are sent from or received by fixed user device 220. In some implementations, messaging system 230 may generate a charge record (e.g., a CDR) when fixed user device 220 sends or receives a text message (e.g., a SMS message or a MMS message). Messaging system 230 may provide the charge record to billing system 260 so that the user of fixed user device 220 may be billed for sending or receiving the text message.

SMPP-GW 240 may include a network device, such as a gateway, a router, a switch, a firewall, a network interface card (NIC), a hub, a bridge, a proxy server, a multiplexer, or some other type of device that processes and/or transfers traffic. In some implementations, SMPP-GW 240 may connect to SMSC/MMSC 250, and may convert a text message into a format that is understood by messaging system 230 and/or SMSC/MMSC 250. In some implementations, SMPP-GW 240 may utilize a protocol, such as the SMPP protocol, to convert the text message into a SMPP format that is understood by messaging system 230 and/or SMSC/MMSC 250.

SMSC/MMSC 250 may include one or more personal computers, workstation computers, server devices, or other types of computation and communication devices. In some implementations, SMSC/MMSC 250 may receive text messages (e.g., SMS messages or MMS messages) from mobile user device 210 and/or fixed user device 220, may store text messages, and may forward text messages. In some implementations, SMSC/MMSC 250 may deliver text messages to mobile user device 210 and/or fixed user device 220, and may maintain unique time stamps in text messages.

Billing system 260 may include one or more personal computers, workstation computers, server devices, or other types of computation and communication devices. In some implementations, billing system 260 may receive charge records (e.g., call data records) from messaging system 230 and/or SMSC/MMSC 250 when text messages are sent from or received by mobile user device 210 and/or fixed user device 220. In some implementations, billing system 260 may generate bills for the users of mobile user device 210 and/or fixed user device 220, based on the charge records, and may provide the bills to the users.

Network 270 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementation, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for synchronizing execution of a text messaging application in a fixed user device and a mobile user device. In some implementations, one or more process blocks of FIG. 4 may be performed by messaging system 230. In some implementations, one or more process blocks of FIG. 4 may be performed by another device or a group of devices separate from or including messaging system 230.

As shown in FIG. 4, process 400 may include receiving a request for a messaging application from a user associated with a fixed user device and a mobile user device (block 410). For example, a user associated with fixed user device 220 and mobile user device 210 may wish to download a messaging application for fixed user device 220 and mobile user device 210. In some implementations, the user may utilize fixed user device 220 to generate a request for the messaging system. Fixed user device 220 may provide the request to messaging system 230, and messaging system 230 may receive the request. In some implementations, the user may utilize fixed user device 220 and a web browser (e.g., provided on fixed user device 220) to access a web page provided by messaging system 230. The web page may include a mechanism (e.g., a button, an icon, a link, a menu item, etc.) that, when selected by the user, may cause fixed user device 220 to provide the request to messaging system 230.

In some implementations, the user may utilize mobile user device 210 to generate another request for the messaging application. Mobile user device 210 may provide the other request to messaging system 230, and messaging system 230 may receive the other request. In some implementations, the user may utilize mobile user device 210 to access an application store that includes applications offered by messaging system 230. The application store may include a mechanism (e.g., a button, an icon, a link, a menu item, etc.) that, when selected by the user, may cause mobile user device 210 to provide the other request to messaging system 230.

As further shown in FIG. 4, process 400 may include providing the messaging application to the fixed user device and the mobile user device based on the request (block 420). For example, messaging system 230 may provide a messaging application to fixed user device 220 based on the request, and may provide the messaging application to mobile user device 210 based on the other request. In some implementations, the messaging application may include an application that enables fixed user device 220 and/or mobile user device 210 to send text messages (e.g., SMS messages and MMS messages) to and receive text messages from other fixed user devices 210 and/or other mobile user devices 210, based on a telephone number of mobile user device 210. In some implementations, the messaging application may provide an integrated messaging service that enables a user to send and receive text messages from fixed user device 220 and/or mobile user device 210 using the telephone number of mobile user device 210.

Fixed user device 220 may receive the messaging application, and may store the messaging application. In some implementations, fixed user device 220 may begin installation of the messaging application, on fixed user device 220, when the user instructs fixed user device 220 to execute a file (e.g., an installation file, an executable file, etc.) associated with the messaging application. In some implementations, fixed user device 220 may automatically begin installation of the messaging application, on fixed user device 220, when the messaging application is received.

Mobile user device 210 may receive the messaging application, and may store the messaging application. In some implementations, mobile user device 210 may begin installation of the messaging application, on mobile user device 210, when the user instructs mobile user device 210 to execute a file (e.g., an installation file, an executable file, etc.) associated with the messaging application. In some implementations, mobile user device 210 may automatically begin installation of the messaging application, on mobile user device 210, when the messaging application is received.

As further shown in FIG. 4, process 400 may include receiving a telephone number of the mobile user device from the fixed user device (block 430). For example, during installation of the messaging application, a user interface may be displayed by fixed user device 220. In some implementations, the user interface may request that the user input the telephone number associated with mobile user device 210. The user may input the telephone number of mobile user device 210 via the user interface, and may instruct fixed user device 220 to provide the telephone number to messaging system 230. For example, the user interface may include a mechanism (e.g., a button, an icon, a link, a menu item, etc.) that, when selected by the user, may cause fixed user device 220 to provide the telephone number to messaging system 230. When the user selects the mechanism, fixed user device 220 may provide the telephone number to messaging system 230, and messaging system 230 may receive the telephone number. In some implementations, messaging system 230 may receive and store an Internet protocol (IP) address of fixed user device 220 when messaging system 230 receives the telephone number.

As further shown in FIG. 4, process 400 may include providing a message with an authentication mechanism to the mobile user device via the telephone number (block 440). For example, when messaging system 230 receives the telephone number associated with mobile user device 210, messaging system 230 may generate an authentication mechanism. In some implementations, the authentication mechanism may include a password (e.g., with alphanumeric characters, numeric characters, or alphabetical characters), a pass phrase, a personal identification number (PIN) (e.g., with alphanumeric characters, numeric characters, or alphabetical characters), etc. In some implementations, messaging system 230 may utilize the telephone number to provide the authentication mechanism, via a message, to mobile user device 210. For example, messaging system 230 may send a text message, with the authentication mechanism, to the telephone number of mobile user device 210. In some implementations, messaging system 230 may associate the authentication mechanism with the IP address of fixed user device 220 in a data structure (e.g., a database, a table, a list, etc.) associated with messaging system 230.

In some implementations, mobile user device 210 may receive the text message with the authentication mechanism, and may provide, to the user, an indication that a text message has been received. The user may utilize mobile user device 210 to access the text message, and mobile user device 210 may display the text message and the authentication mechanism to the user.

As further shown in FIG. 4, process 400 may include providing a user interface, requesting the authentication mechanism, to the fixed user device (block 450). For example, while or after providing the message with the authentication mechanism to mobile user device 210, messaging system 230 may generate a user interface, and may provide the user interface to fixed user device 220. Fixed user device 220 may receive the user interface, and may display the user interface to the user. In some implementations, the user interface may request that the user provide the authentication mechanism sent to mobile user device 210.

As further shown in FIG. 4, if the fixed user device provides the authentication mechanism (block 450—AUTH. MECH. RECEIVED), process 400 may include synchronizing the fixed user device and the mobile user device for the messaging application (block 460). For example, if the user wishes to synchronize fixed user device 220 and mobile user device 210 for utilization of the messaging application, the user may input the authentication mechanism via the user interface. In some implementations, the user interface may include a mechanism (e.g., a button, an icon, a link, a menu item, etc.) that, when selected by the user, may cause fixed user device 220 to provide the authentication mechanism to messaging system 230.

Messaging system 230 may receive the authentication mechanism, and may compare the received authentication mechanism with authentication mechanisms stored in a data structure (e.g., a database, a table, a list, etc.) associated with messaging system 230. In some implementations, the data structure may store authentication mechanisms that have been provided to fixed user devices 210, and identifiers (e.g., IP addresses) associated with fixed user devices 210. In some implementations, messaging system 230 may compare the stored authentication mechanisms with the received authentication mechanism. If the received authentication mechanism matches an authentication mechanism associated with the IP address of fixed user device 220, messaging system 230 may synchronize fixed user device 220 and mobile user device 210 for utilization of the messaging application. In some implementations, when synchronizing fixed user device 220 and mobile user device 210, messaging system 230 may enable a user to send and receive text messages from fixed user device 220 and/or mobile user device 210 using the telephone number of mobile user device 210, may enable text messages received or sent from fixed user device 220 to be copied to mobile user device 210, may enable text messages received or sent from mobile user 210 to be copied to fixed user device 220, etc. In some implementations, messaging system 230 may create a profile for the user in the data structure. The profile may include information associated with the user's name, the IP address of fixed user device 220, the telephone number of mobile user device 210, billing information associated with the telephone number, etc.

In some implementations, messaging system 230 may enable a user to send and receive text messages from fixed user device 220 via a web-based messaging application. For example, the user may utilize fixed user device 220 and a web browser (e.g., provided on fixed user device 220) to access the Internet and to access the web-based messaging application, via the Internet, from messaging system 230. The user may utilize the web-based messaging application to send and receive text messages. In some implementations, messaging system 230 may enable a user to send and receive text messages from fixed user device 220 via a messaging application installed on fixed user device 220. For example, the user may utilize fixed user device 220 to install the messaging application on fixed user device 220. After the messaging application is installed, the user may utilize fixed user device 220 to execute the messaging application and send and receive text messages.

As further shown in FIG. 4, if the fixed user device does not provide the authentication mechanism (block 450—AUTH. MECH. NOT RECEIVED), process 400 may include not synchronizing the fixed user device and the mobile user device for the messaging application (block 470). For example, the user may input an incorrect authentication mechanism via the user interface. In such situations, messaging system 230 may not synchronize fixed user device 220 and mobile user device 210 for utilization of the messaging application. In some implementations, when fixed user device 220 and mobile user device 210 are not synchronized, the user may utilize the messaging application via mobile user device 210 but may not utilize the messaging application via fixed user device 220. For example, when fixed user device 220 and mobile user device 210 are not synchronized, fixed user device 220 may not be able to utilize the telephone number of mobile user device 210 to send and receive text messages. In some implementations, messaging system 230 may permit the user to input the authentication mechanism again if the user inputs an incorrect authentication mechanism via the user interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
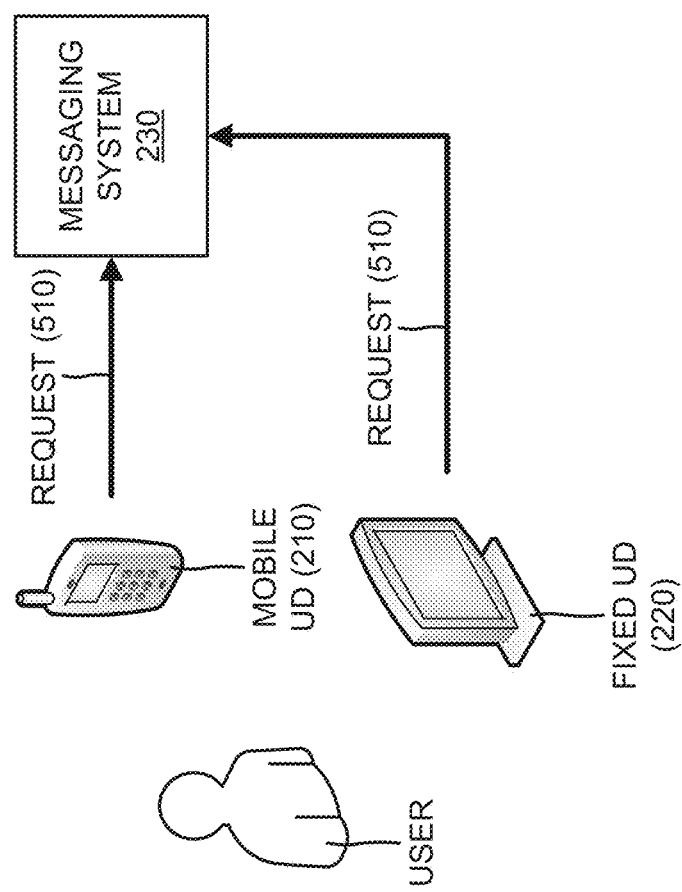
FIGS. 5A-5D are diagrams of an example relating to the example process shown in FIG. 4.

FIGS. 5A-5D are diagrams of an example 500 relating to example process 400 shown in FIG. 4. In example 500, assume that a user (e.g., USER) is associated with mobile user device 210 and fixed user device 220, as shown in FIG. 5A. If the user is not using a messaging application provided by messaging system 230, the user may wish to download the messaging application from messaging system 230. In example 500, assume that the user utilizes mobile user device 210 to provide a request 510 for the messaging application to messaging system 230, as further shown in FIG. 5A. In some implementations, the user may utilize mobile user device 210 to access an application store that includes applications offered by messaging system 230. The application store may include a mechanism (e.g., a button, an icon, a link, a menu item, etc.) that, when selected by the user, may cause mobile user device 210 to provide request 510 to messaging system 230.

Further, assume that the user utilizes fixed user device 220 to provide request 510 for the messaging application to messaging system 230. In some implementations, the user may utilize fixed user device 220 and a web browser (e.g., provided on fixed user device 220) to access a web page provided by messaging system 230. The web page may ask whether the user wants to download the messaging application. Since the user wishes to download the messaging application, the user may utilize the web page to provide request 510 to messaging system 230.

Figure 5B:
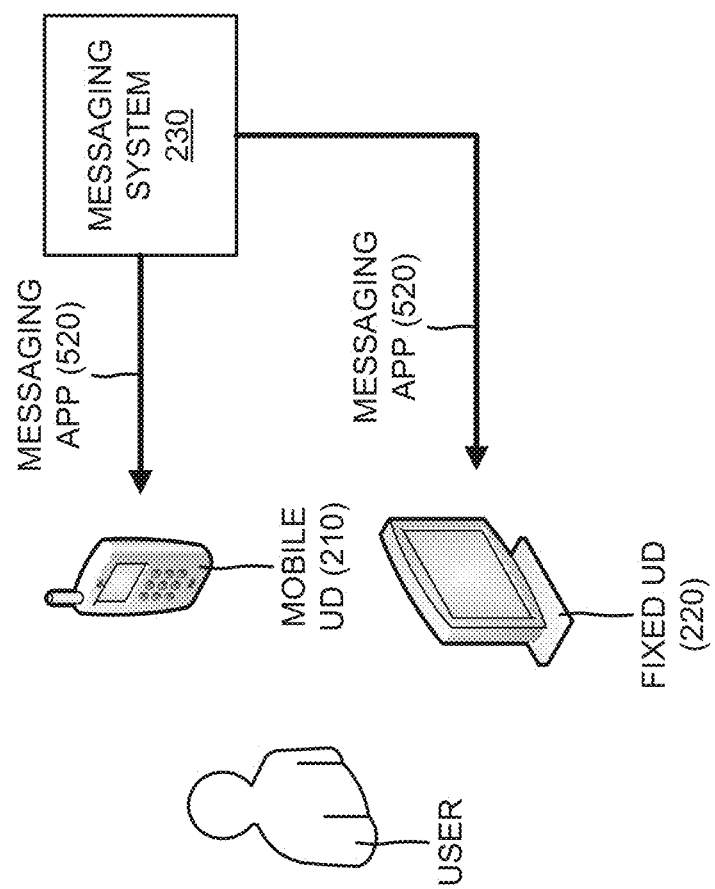

Based on requests 510 to download the messaging application, assume that messaging system 230 provides a messaging application 520 to mobile user device 210 and fixed user device 220, as shown in FIG. 5B. Messaging application 520 may include an application that enables fixed user device 220 and/or mobile user device 210 to send and receive text messages, based on a telephone number associated with mobile user device 210. Messaging application 520 may enable a telecommunications provider to charge the user every time text message is sent to or received by fixed user device 220.

Figure 5C:
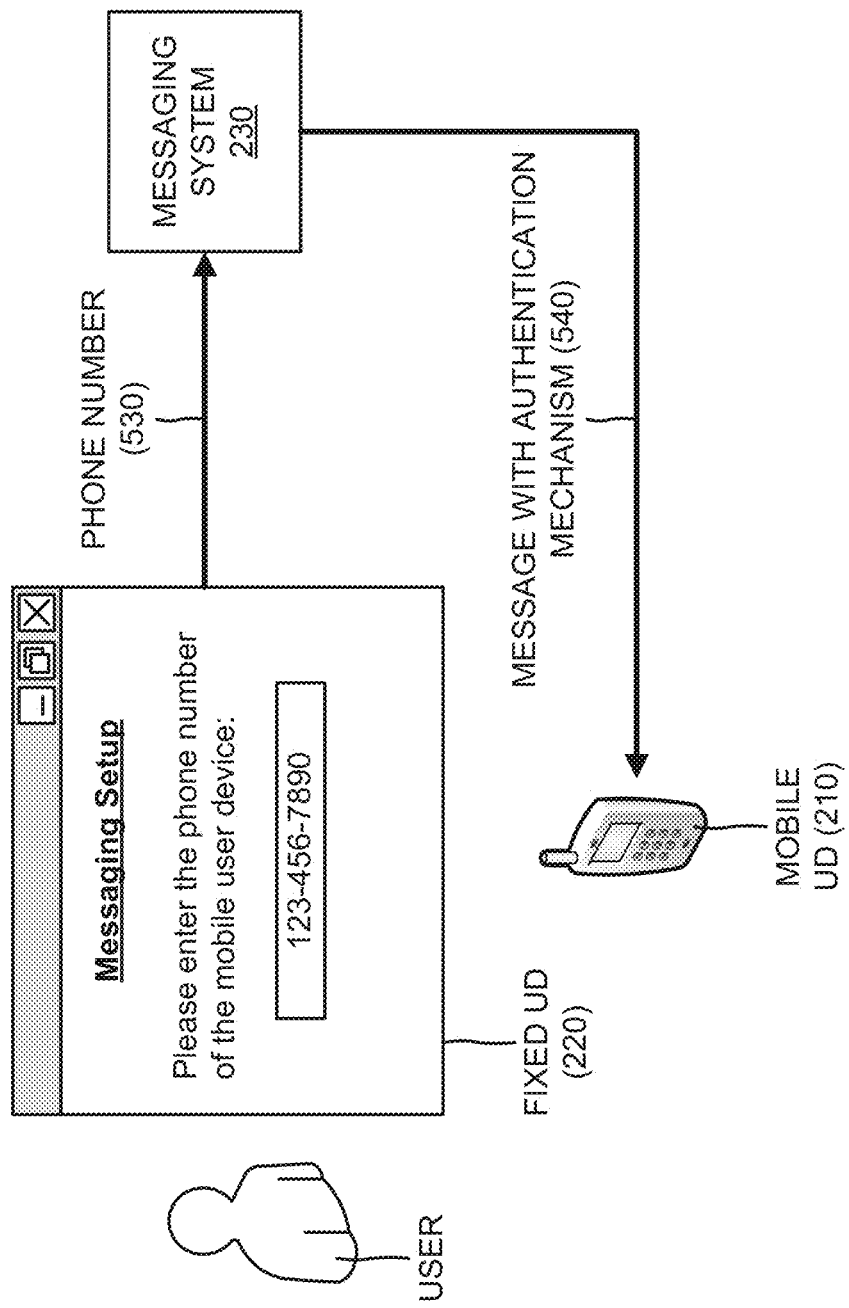

In example 500, assume that the user instructs mobile user device 210 and fixed user device 220 to begin installation of messaging application 520 on mobile user device 210. During installation of messaging application 520 on fixed user device 220, a user interface may be displayed by fixed user device 220 to the user, as shown in FIG. 5C. The user interface may request that the user input a telephone number 530 of mobile user device 210. In example 500, assume that the user inputs telephone number 530 (e.g., "123-456-7890") of mobile user device 210, via the user interface, and instructs fixed user device 220 to provide telephone number 530 to messaging system 230. Based on the user's instruction, fixed user device 220 may provide telephone number 530 to messaging system 230, as further shown in FIG. 5C.

When messaging system 230 receives telephone number 530 associated with mobile user device 210, messaging system 230 may generate an authentication mechanism, such as an alphanumeric password or PIN. In example 500, messaging system 230 may utilize the telephone number to provide the authentication mechanism, via a message 540, to mobile user device 210, as further shown in FIG. 5C. Mobile user device 210 may receive message 540, and may display message 540 and the authentication mechanism to the user.

Figure 5D:
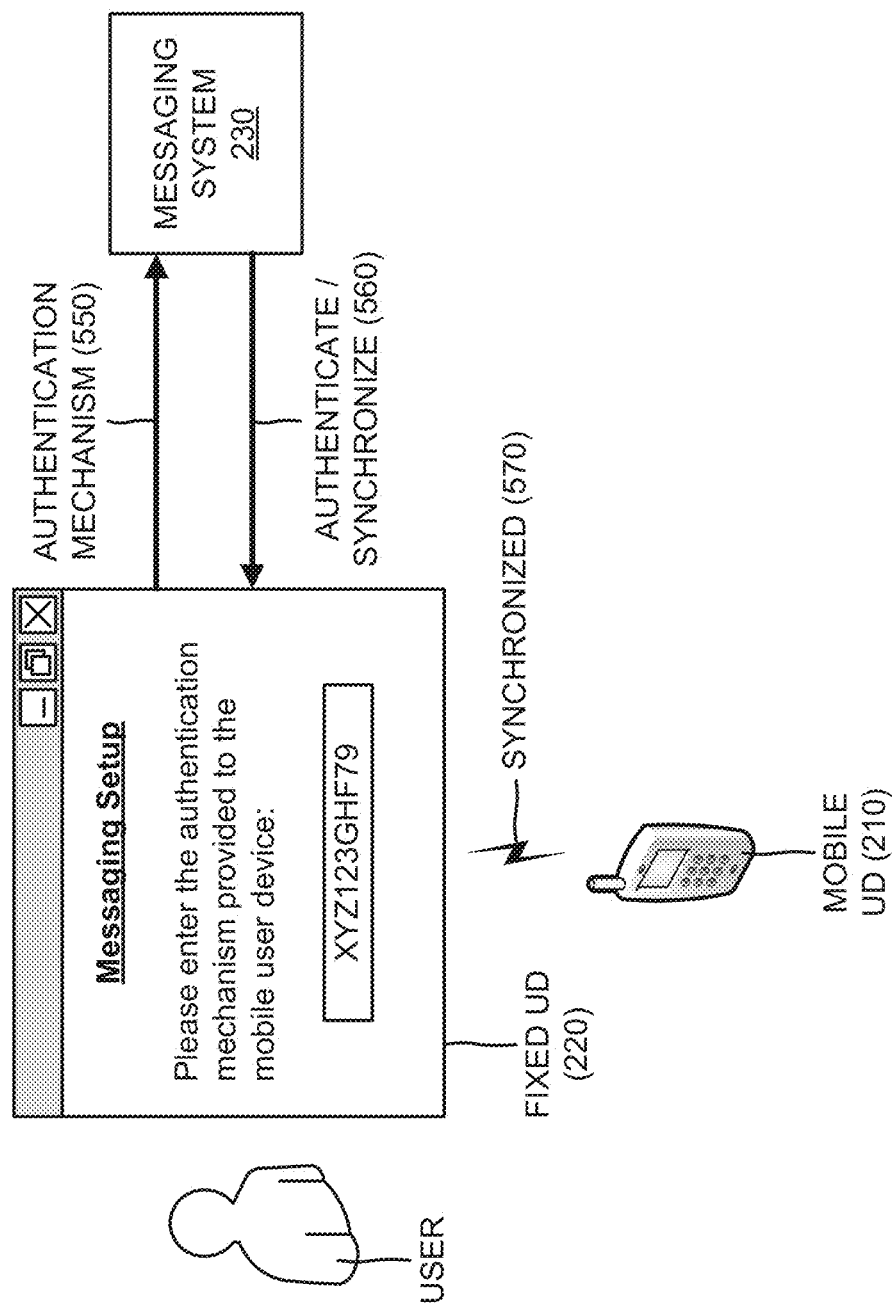

After telephone number 530 is provided to messaging system 230, another user interface may be displayed by fixed user device 220 to the user, as shown in FIG. 5D. The other user interface may request that the user input the authentication mechanism provided to mobile user device 210 via message 540. In example 500, assume that the user inputs, via the other user interface, an authentication mechanism 550 (e.g., "XYZ123GHF79") received by mobile user device 210 via message 540. Further, assume that the user instructs fixed user device 220 to provide authentication mechanism 550 to messaging system 230. Based on the user's instruction, fixed user device 220 may provide authentication mechanism 550 to messaging system 230, as further shown in FIG. 5D.

When messaging system 230 receives authentication mechanism 550, messaging system 230 may compare authentication mechanism 550 with authentication mechanisms stored in the data structure associated with messaging system 230. In example 500, assume that authentication mechanism 550 matches an authentication mechanism associated with the IP address of fixed user device 220, as stored in the data structure. Based on this match, messaging system 230 may authenticate that the user is associated with fixed user device 220 and mobile user device 210, and may synchronize fixed user device 220 and mobile user device 210 for utilization of messaging application 520, as indicated by reference number 560 in FIG. 5D. When messaging system 230 performs these operations, fixed user device 220 and mobile user device 210 may be synchronized for utilization of messaging application 520, as indicated by reference number 570 in FIG. 5D. When fixed user device 220 and mobile user device 210 are synchronized, messaging system 230 may enable the user to send and receive text messages from fixed user device 220 and/or mobile user device 210 using telephone number 530 of mobile user device 210.

As indicated above, FIGS. 5A-5D are provided merely as an example. Other examples are possible and may differ from what was described with regard to FIGS. 5A-5D.

FIG. 6 is a flow chart of an example process 600 for charging for a text message sent by a fixed user device. In some implementations, one or more process blocks of FIG. 6 may be performed by messaging system 230. In some implementations, one or more process blocks of FIG. 6 may be performed by another device or a group of devices separate from or including messaging system 230.

As shown in FIG. 6, process 600 may include receiving a message, from a fixed device associated with a first user, which is destined for a mobile device associated with a second user (block 610). For example, a first user may be associated with fixed user device 220 and a first mobile user device 210. In some implementations, the first user may utilize the messaging application, provided on fixed user device 220, to create a text message (e.g., a SMS message or a MMS message). In some implementations, the text message may be addressed to a second user associated with a second mobile user device 210 and may include information associated with the first user, such as, for example, an IP address of fixed user device 220, the first user's name, etc. After creating the text message, the first user may instruct fixed user device 220 to send the text message to the second user, and fixed user device 220 may provide the text message to messaging system 230 based on the first user's instruction. Messaging system 230 may receive the text message. In some implementations, the text message may be addressed to fixed user device 220 associated with the second user, rather than the second mobile user device 210.

As further shown in FIG. 6, process 600 may include generating a first charge record for the first user based on the message (block 620). For example, when messaging system 230 receives the text message, messaging system 230 may generate a first charge record for the first user based on the text message. In some implementations, messaging system 230 may analyze the text message to determine the IP address of fixed user device 220 and/or the first user's name. Messaging system 230 may compare the IP address and/or the first user's name with the profiles stored in the data structure associated with messaging system 230. In some implementations, messaging system 230 may determine that IP address and/or the first user's name matches a profile, stored in the data structure, which includes a telephone number of the first mobile user device 210.

In some implementations, messaging system 230 may generate the first charge record based on the telephone number of the first mobile user device 210. For example, the first charge record may include a charge similar to a messaging charge that is generated when the first mobile user device 210 sends a text message. In another example, the first charge record may include a charge that is less than or greater than the messaging charge. In some implementations, the first charge record may include a mobile originated (MO) call data record (CDR), for the first user, which is based on the telephone number of the first mobile user device 210.

As further shown in FIG. 6, process 600 may include providing the first charge record to a billing system (block 630). For example, messaging system 230 may provide the first charge record to billing system 260. In some implementations, billing system 260 may receive the first charge record from messaging system 230, and may associate the first charge record with an account of the first user. For example, billing system 260 may be associated with a telecommunications provider that provides telecommunications services for the first user. The telecommunications provider may maintain an account for the first user via billing system 260. In some implementations, the account may keep track of telecommunications services utilized by the first user and costs associated with such telecommunications services. In some implementations, billing system 260 may generate, for the first user, a bill (e.g., a monthly bill, a use-based bill, etc.) that includes the first charge record, and may provide the bill to the first user (e.g., electronically, via a paper bill, etc.).

As further shown in FIG. 6, process 600 may include providing a copy of the message to a mobile device associated with the first user (block 640). For example, messaging system 230 may generate a copy of the text message received from fixed user device 220. In some implementations, messaging system 230 may provide the copy of the text message to the first mobile user device 210. In some implementations, messaging system 230 may store the copy of the text message. In such implementations, the first user may utilize the first mobile user device 210 to access messaging system 230 and view the copy of the text message stored by messaging system 230.

Such an arrangement may enable the first user to access text messages from either fixed user device 220 or the first mobile user device 210. In some implementations, the first user may begin a text messaging session with the second user on fixed user device 220, and may continue the text messaging session on the first mobile user device 210. For example, the first user may begin the text messaging session while at home on fixed user device 220, but may leave the home with the first mobile user device 210. In this example, the first user may continue the text messaging session with the first mobile user device 210.

As further shown in FIG. 6, process 600 may include forwarding the message toward the mobile device associated with the second user, which causes a second charge record for the second user to be generated and provided to the billing system (block 650). For example, messaging system 230 may provide the text message to SMPP-GW 240, and SMPP-GW 240 may receive the text message. In some implementations, SMPP-GW 240 may convert the text message into a format understood by SMSC/MMSC 250, and may provide the converted text message to SMSC/MMSC 250. SMSC/MMSC 250 may receive the text message, and may provide the text message to the second mobile user device 210 associated with the second user. The second mobile user device 210 may receive the text message, and may display the text message to the second user.

In some implementations, SMSC/MMSC 250 may generate a second charge record for the second user based on the text message. In some implementations, SMSC/MMSC 250 may analyze the text message to determine the telephone number of the second mobile user device 210. SMSC/MMSC 250 may compare telephone number of the second mobile user device 210 with telephone numbers stored in a data structure (e.g., a database, a table, a list, etc.) associated with SMSC/MMSC 250. In some implementations, messaging system 230 may determine that the telephone number matches a telephone number, stored in the data structure, which includes information associated with the second user and the second mobile user device 210.

In some implementations, SMSC/MMSC 250 may generate the second charge record based on the telephone number of the second mobile user device 210. In some implementations, the text message may be provided to a fixed user device 220 associated with the second user. In such implementations, SMSC/MMSC 250 may generate the second charge record based on the telephone number of the second mobile user device 210. For example, the second charge record may include a charge similar to a messaging charge that is generated when the second mobile user device 210 receives a text message. In another example, the second charge record may include a charge that is less than or greater than the messaging charge. In some implementations, the second charge record may include a mobile terminated (MT) call data record (CDR), for the second user, which is based on the telephone number of the second mobile user device 210.

SMSC/MMSC 250 may provide the second charge record to billing system 260. In some implementations, billing system 260 may receive the second charge record from SMSC/MMSC 250, and may associate the second charge record with an account of the second user. For example, billing system 260 may be associated with a telecommunications provider that provides telecommunications services for the second user. The telecommunications provider may maintain an account for the second user via billing system 260. In some implementations, the account may keep track of telecommunications services utilized by the second user and costs associated with such telecommunications services. In some implementations, billing system 260 may generate, for the second user, a bill (e.g., a monthly bill, a use-based bill, etc.) that includes the second charge record, and may provide the bill to the second user (e.g., electronically, via a paper bill, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
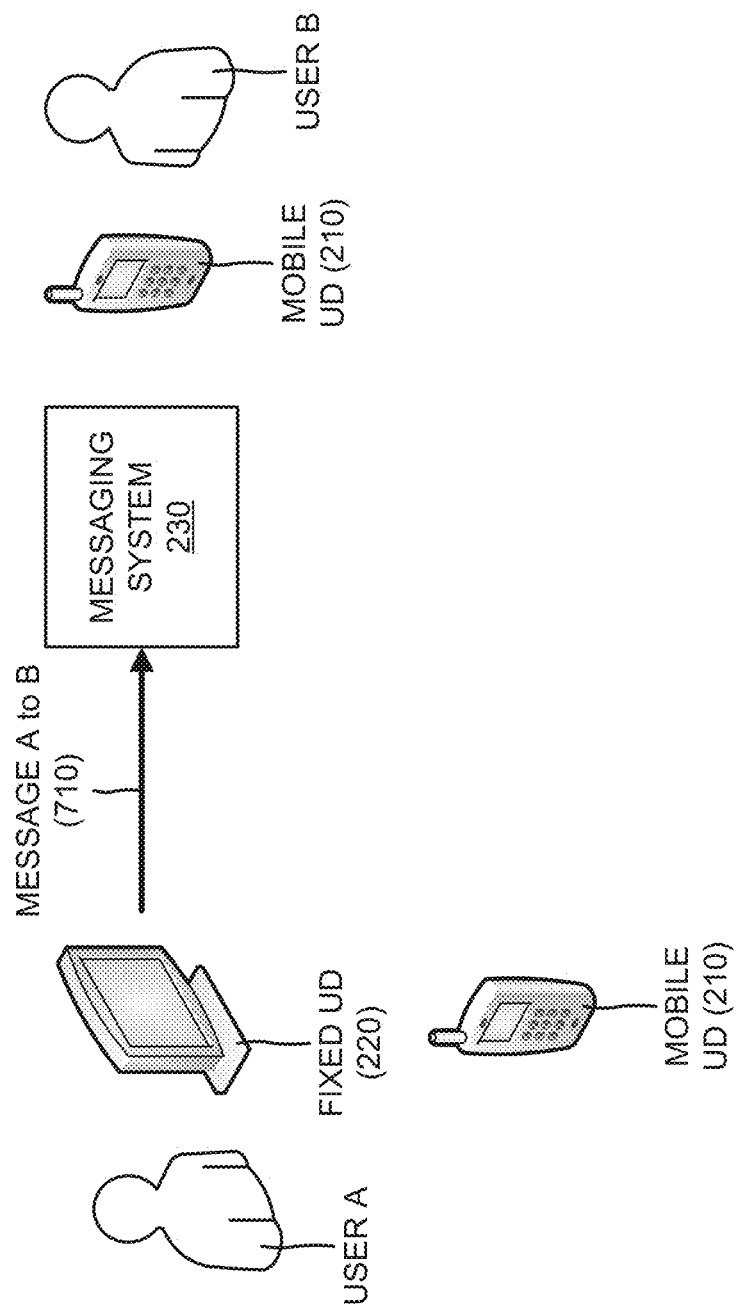

FIGS. 7A-7F are diagrams of an example 700 relating to example process 600 shown in FIG. 6. In example 700, assume that a first user (e.g., User A) is associated with fixed user device 220 and a first mobile user device 210, and that a second user (e.g., User B) is associated with a second mobile user device 210, as shown in FIG. 7A. Further, assume that User A utilizes fixed user device 220 and the messaging application to generate a message 710 addressed to User B. As shown in FIG. 7A, fixed user device 220 may provide message 710 to messaging system 230, and messaging system 230 may receive message 710.

Messaging system 230 may generate a charge record 720 for User A based on message 710, as shown in FIG. 7B. In some implementations, charge record 720 may include a mobile originated (MO) call data record (CDR), for User A, which is based on the telephone number of the first mobile user device 210. As further shown in FIG. 7B, messaging system 230 may provide charge record 720 to billing system 260. Billing system 260 may receive charge record 720, and may associate charge record 720 with an account of User A. In some implementations, the account may keep track of telecommunications services utilized by User A and costs associated with such telecommunications services. In some implementations, billing system 260 may generate, for User A, a bill based on charge record 720, and may provide the bill to User A.

Figure 7C:
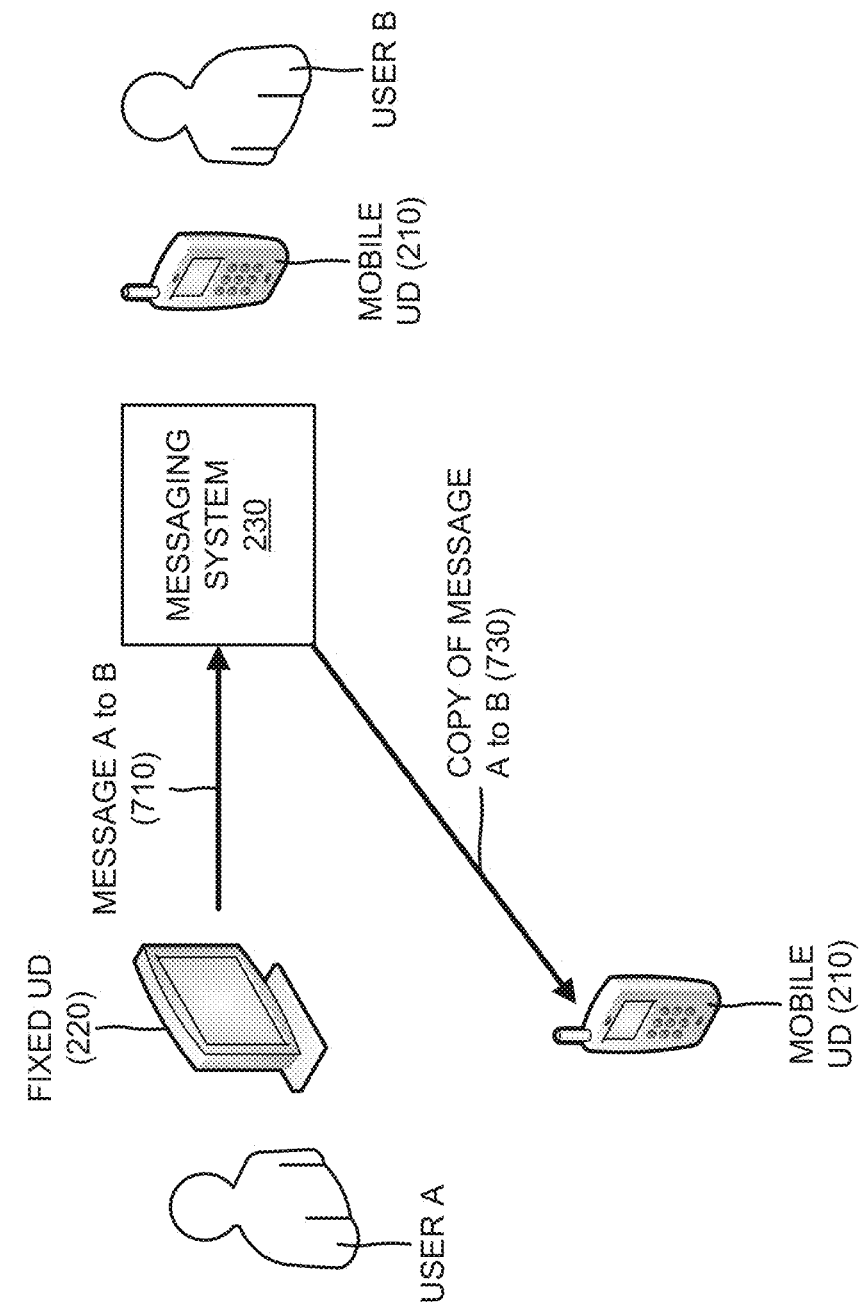

In some implementations, messaging system 230 may generate a copy of message 710, as indicated by reference number 730 in FIG. 7C. In some implementations, messaging system 230 may provide copy 730 to the first mobile user device 210, as further shown in FIG. 7C. In some implementations, messaging system 230 may store copy 730 so that User A may access copy 730, via the first mobile user device 210, at a later time. For example, User A may utilize the first mobile user device 210 to access messaging system 230 and view copy 730 stored by messaging system 230.

In example 700, messaging system 230 may provide message 710 to SMPP-GW 240, and SMPP-GW 240 may receive message 710, as shown in FIG. 7D. SMPP-GW 240 may convert message 710 into a format understood by SMSC/MMSC 250, and may provide the converted message 710 to SMSC/MMSC 250, as further shown in FIG. 7D. SMSC/MMSC 250 may receive message 710, and may provide message 710 to the second mobile user device 210 associated with User B. The second mobile user device 210 may receive message 710, and may display message 710 to User B.

In some implementations, SMSC/MMSC 250 may generate a charge record 740 for User B based on message 710, as further shown in FIG. 7D. In some implementations, charge record 740 may include a mobile terminated (MT) call data record (CDR), for User B, which is based on the telephone number of the second mobile user device 210. SMSC/MMSC 250 may provide charge record 740 to billing system 260, as shown in FIG. 7D. In some implementations, billing system 260 may receive charge record 740 from SMSC/MMSC 250, and may associate charge record 740 with an account of User B. In some implementations, the account may keep track of telecommunications services utilized by User B and costs associated with such telecommunications services. In some implementations, billing system 260 may generate, for User B, a bill based on charge record 740, and may provide the bill to User B.

In some implementations, when message 710 is generated via the web-based messaging application, a call flow 750 may be performed, as shown in FIG. 7E. As shown, User A may utilize fixed user device 220 to access the Internet and establish a hypertext transfer protocol (HTTP) session with messaging system 230. After establishing the HTTP session, fixed user device 220 may provide a message, addressed to User B, to messaging system 230. Messaging system 230 may filter, block, or throttle international telephone numbers (if any) utilized by fixed user device 220. Messaging system 230 may then determine if User A is a prepaid customer. If User A is a prepaid customer, messaging system 230 may check User A's credit with a Prepaid service to determine whether User A has enough credit to send the message to User B. As further shown in FIG. 7E, assume that the Prepaid service determines that User A has enough credit to send the message to User B (e.g., Credit OK).

Messaging system 230 may determine if User A is a usage control (UC) customer (e.g., a customer with a limit on an amount of messages that may be sent or received or on an amount of data usage). If User A is a usage control customer, messaging system 230 may check User A's usage control with a Usage Control service to determine whether User A may send the message to User B. As further shown in FIG. 7E, assume that the Usage Control service determines that User A has not reached a message or data usage limit and may send the message to User B (e.g., UC OK).

Messaging system 230 may provide the message to a messaging synchronization (Msg Sync) portion of messaging system 230, and the messaging synchronization portion may store the message and provide the message to a Java Messaging Service (JMS) (e.g., a service that provides an exchange of messages between software components). The JMS may forward the message to SMSC/MMSC 250, and SMSC/MMSC 250 may provide a response to the JMS based on the message. The JMS may provide the response to the message synchronization portion.

Messaging system 230 may generate a message status based on the response, and may store (e.g., Submit status) the message status in a message storage (Msg Storage) portion of messaging system 230, after performing an Internet message access protocol (IMAP) login of the message storage portion. The message storage portion may indicate to the message synchronization portion that the IMAP login was successful (e.g., Login OK). The message synchronization portion may store the message (e.g., Store Msg) in the message storage portion, and the message storage portion may indicate that the message was stored (e.g., Store OK). The message synchronization portion may perform an IMAP logout (e.g., Logout), and the message storage portion may indicate that the logout was successful (e.g., Bye).

As further shown in FIG. 7E, if User A is a prepaid customer, messaging system 230 may request that the Prepaid service deduct credit from User A, and the Prepaid service may deduct the credit (e.g., OK). If User A is a usage control customer, messaging system 230 may request that the Usage Control service deduct usage from User A, and the Usage Control service may deduct the usage (e.g., OK). Messaging system 230 may also output a call data record (CDR) for User A's transmission of the message.

As further shown in FIG. 7E, in some implementations, SMSC/MMSC 250 may provide the message to a third party inter-carrier service, and the third party service may forward the message to User B (e.g., to mobile user device 210 associated with User B). In some implementations, SMSC/MMSC 250 may forward the message to User B (e.g., to mobile user device 210 associated with User B), without utilizing the third party service. After forwarding the message, SMSC/MMSC 250 may provide a delivery receipt to the JMS, and the JMS may provide the delivery receipt to the message synchronization portion of messaging system 230. Messaging system 230 may also store the delivery receipt in the message storage portion, and may provide the delivery receipt to fixed user device 220 associated with User A. The message synchronization portion may store a message identifier (Msg ID) in the message storage portion.

Figure 7F:
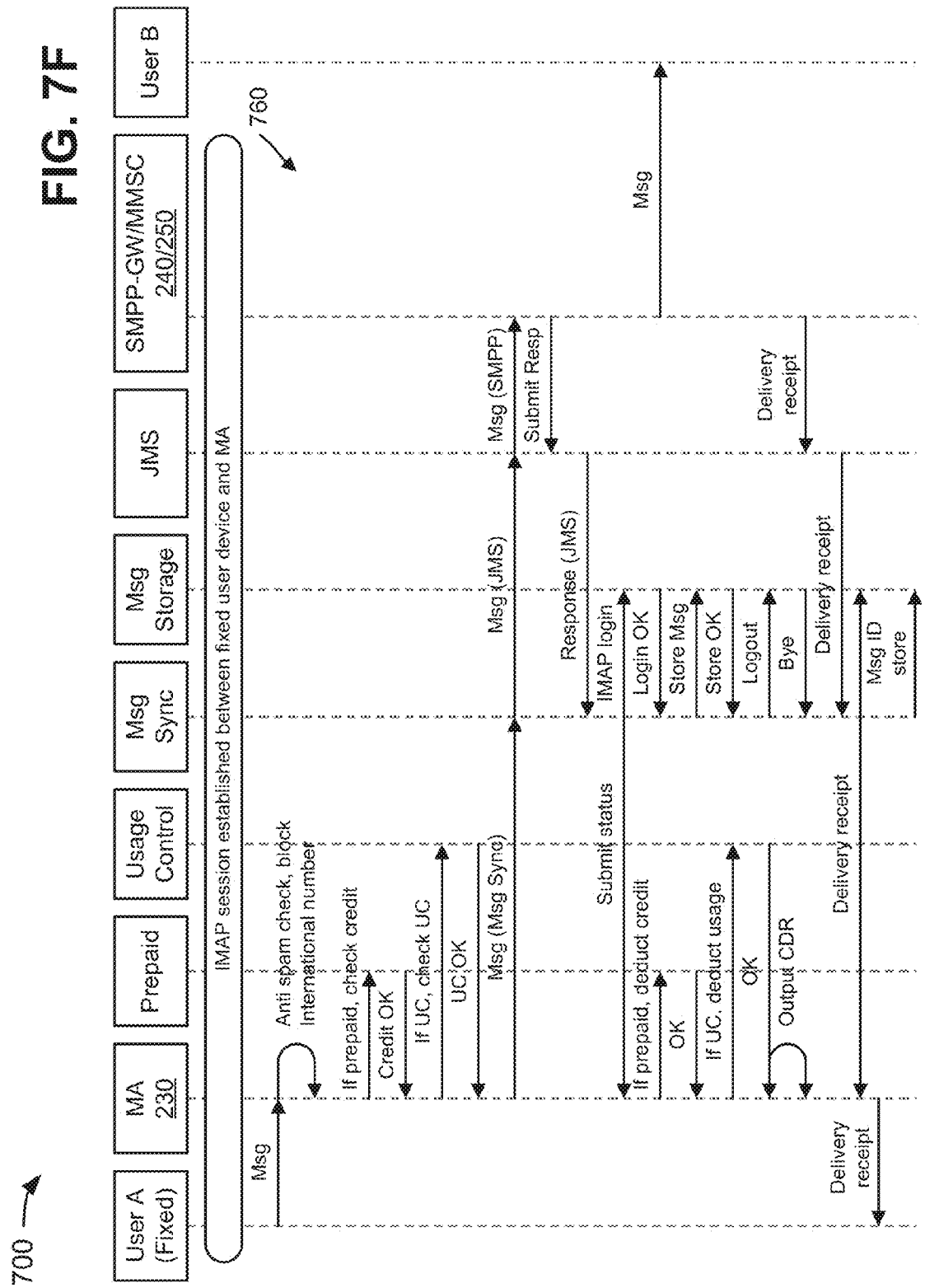

In some implementations, when message 710 is generated via the messaging application installed on fixed user device 220, a call flow 760 may be performed, as shown in FIG. 7F. As shown, User A may utilize fixed user device 220 to establish an IMAP session with messaging system 230. After establishing the IMAP session, fixed user device 220 may provide a message, addressed to User B, to messaging system 230. Messaging system 230 may perform an anti-spam check on the message, and may filter, block, or throttle international telephone numbers (if any) utilized by fixed user device 220. Messaging system 230 may then determine if User A is a prepaid customer. If User A is a prepaid customer, messaging system 230 may check User A's credit with the Prepaid service to determine whether User A has enough credit to send the message to User B. As further shown in FIG. 7F, assume that the Prepaid service determines that User A has enough credit to send the message to User B (e.g., Credit OK).

Messaging system 230 may determine if User A is a usage control customer. If User A is a usage control customer, messaging system 230 may check User A's usage control with the Usage Control service to determine whether User A may send the message to User B. As further shown in FIG. 7F, assume that the Usage Control service determines that User A has not reached a message or data usage limit and may send the message to User B (e.g., UC OK).

Messaging system 230 may provide the message to the messaging synchronization (Msg Sync) portion of messaging system 230, and the messaging synchronization portion may store the message and provide the message to the JMS. The JMS may forward the message to SMPP-GW 240 and SMSC/MMSC 250, and SMPP-GW 240 and SMSC/MMSC 250 may provide a response to the JMS based on the message. The JMS may provide the response to the message synchronization portion.

Messaging system 230 may generate a message status based on the response, and may store (e.g., Submit status) the message status in the message storage (Msg Storage) portion of messaging system 230, after performing an IMAP login of the message storage portion. The message storage portion may indicate to the message synchronization portion that the IMAP login was successful (e.g., Login OK). The message synchronization portion may store the message (e.g., Store Msg) in the message storage portion, and the message storage portion may indicate that the message was stored (e.g., Store OK). The message synchronization portion may perform an IMAP logout (e.g., Logout), and the message storage portion may indicate that the logout was successful (e.g., Bye).

As further shown in FIG. 7F, if User A is a prepaid customer, messaging system 230 may request that the Prepaid service deduct credit from User A, and the Prepaid service may deduct the credit (e.g., OK). If User A is a usage control customer, messaging system 230 may request that the Usage Control service deduct usage from User A, and the Usage Control service may deduct the usage (e.g., OK). Messaging system 230 may also output a call data record (CDR) for User A's transmission of the message.

As further shown in FIG. 7F, in some implementations, SMPP-GW 240 and SMSC/MMSC 250 may provide the message to User B (e.g., to mobile user device 210 associated with User B). After forwarding the message, SMPP-GW 240 and SMSC/MMSC 250 may provide a delivery receipt to the JMS, and the JMS may provide the delivery receipt to the message synchronization portion of messaging system 230. Messaging system 230 may also store the delivery receipt in the message storage portion, and may provide the delivery receipt to fixed user device 220 associated with User A. The message synchronization portion may store a message identifier (Msg ID) in the message storage portion.

As indicated above, FIGS. 7A-7F are provided merely as an example. Other examples are possible and may differ from what was described with regard to FIGS. 7A-7F.

FIG. 8 is a flow chart of an example process 800 for charging for a text message received by a fixed user device. In some implementations, one or more process blocks of FIG. 8 may be performed by messaging system 230 and SMSC/MMSC 250. In some implementations, one or more process blocks of FIG. 8 may be performed by another device or a group of devices separate from or including messaging system 230 and SMSC/MMSC 250.

As shown in FIG. 8, process 800 may include receiving a message, from a first mobile device associated with a first user, which is destined for a second mobile device associated with a second user (block 805). For example, a first user may be associated with a first mobile user device 210, and a second user may be associated with fixed user device 220 and a second mobile user device 210. In some implementations, the first user may utilize the messaging application, provided on the first mobile user device 210, to create a text message (e.g., a SMS message or a MMS message). In some implementations, the text message may be addressed to the second user and may include information associated with the first user, such as, for example, a telephone number of the first mobile user device 210, the first user's name, etc. After creating the text message, the first user may instruct the first mobile user device 210 to send the text message to the second user, and the first mobile user device 210 may provide the text message to SMSC/MMSC 250 based on the first user's instruction. SMSC/MMSC 250 may receive the text message.

As further shown in FIG. 8, process 800 may include determining whether the second mobile device is operational (block 810). For example, SMSC/MMSC 250 may determine whether the second mobile user device 210, associated with the second user, is operational. In some implementations, SMSC/MMSC 250 may determine whether the second mobile user device 210 is turned on or turned off based on a signal received from the second mobile user device 210. If SMSC/MMSC 250 determines that the second mobile user device 210 is turned off (e.g., no signal is received from the second mobile user device 210), SMSC/MMSC 250 may determine that the second mobile user device 210 is not operational. In some implementations, when the second mobile user device 210 is not operational, SMSC/MMSC 250 may store the text message. If SMSC/MMSC 250 determines that the second mobile user device 210 is turned on (e.g., a signal is received from the second mobile user device 210), SMSC/MMSC 250 may determine that the second mobile user device 210 is operational.

As further shown in FIG. 8, if the second mobile device associated with the second user is operational (block 810—YES), process 800 may include generating a charge record for the second user based on the message (block 815). For example, if SMSC/MMSC 250 determines that the second mobile user device 210 is operational, SMSC/MMSC 250 may generate a charge record for the second user based on the text message. In some implementations, SMSC/MMSC 250 may analyze the text message to determine the telephone number of the second mobile user device 210. SMSC/MMSC

250 may compare the telephone number with profiles stored in a data structure associated with SMSC/MMSC 250. In some implementations, SMSC/MMSC 250 may determine that the telephone number matches a profile, stored in the data structure, associated with the second user. In some implementations, the charge record may include a mobile terminated (MT) call data record (CDR), for the second user, which is based on the telephone number of the second mobile user device 210.

As further shown in FIG. 8, process 800 may include providing the charge record to a billing system (block 820). For example, SMSC/MMSC 250 may provide the charge record to billing system 260. In some implementations, billing system 260 may receive the charge record from SMSC/MMSC 250, and may associate the charge record with an account of the second user. For example, billing system 260 may be associated with a telecommunications provider that provides telecommunications services for the second user. The telecommunications provider may maintain an account for the second user via billing system 260. In some implementations, the account may keep track of telecommunications services utilized by the second user and costs associated with such telecommunications services. In some implementations, billing system 260 may generate, for the second user, a bill (e.g., a monthly bill, a use-based bill, etc.) that includes the charge record, and may provide the bill to the second user (e.g., electronically, via a paper bill, etc.).

As further shown in FIG. 8, process 800 may include providing the message to the second mobile device associated with the second user (block 825). For example, SMSC/MMSC 250 may provide the text message to the second mobile user device 210 based on the telephone number associated with the second mobile user device 210. In some implementations, the second mobile user device 210 may display the text message to the second user.

As further shown in FIG. 8, if the second mobile device associated with the second user is not operational (block 810—NO), process 800 may include generating a copy of the message (block 830). For example, if SMSC/MMSC 250 determines that the second mobile user device 210 is nonoperational, SMSC/MMSC 250 may generate a copy of the text message. In some implementations, SMSC/MMSC 250 may store the text message, and may provide the text message to the second mobile user device 210 when the second mobile user device 210 becomes operational again. In some implementations, SMSC/MMSC 250 may provide the copy of the text message to messaging system 230.

As further shown in FIG. 8, process 800 may include receiving the copy of the message (block 835). For example, SMSC/MMSC 250 may provide the copy of the text message to messaging system 230. In some implementations, SMSC/MMSC 250 may provide the copy of the text message to messaging system 230 when SMSC/MMSC 250 determines that the second mobile user device 210 is nonoperational. Messaging system 230 may receive the copy of the text message.

As further shown in FIG. 8, process 800 may include generating a charge record for the second user based on the copy of the message (block 840). For example, when messaging system 230 receives the copy of the text message, messaging system 230 may generate a charge record for the second user based on the text message. In some implementations, messaging system 230 may analyze the copy of the text message to determine the telephone number of the second mobile user device 210. Messaging system 230 may compare the telephone number with the profiles stored in the data structure associated with messaging system 230. In some implementations, messaging system 230 may determine that the telephone number matches a profile, stored in the data structure, which includes a telephone number associated with the second user. In some implementations, the first charge record may include a mobile terminated (MT) call data record (CDR), for the second user, which is based on the telephone number of the second mobile user device 210.

As further shown in FIG. 8, process 800 may include providing the charge record to the billing system (block 845). For example, messaging system 230 may provide the charge record to billing system 260. In some implementations, billing system 260 may receive the charge record from messaging system 230, and may associate the charge record with an account of the second user. In some implementations, billing system 260 may generate, for the second user, a bill (e.g., a monthly bill, a use-based bill, etc.) that includes the charge record, and may provide the bill to the second user (e.g., electronically, via a paper bill, etc.).

As further shown in FIG. 8, process 800 may include providing the copy of the message to a fixed device associated with the second user (block 850). For example, messaging system 230 may provide the copy of the text message to fixed user device 220 associated with the second user. In some implementations, messaging system 230 may store the copy of the text message. In such implementations, the second user may utilize fixed user device 220 to access messaging system 230 and view the copy of the text message stored by messaging system 230.

Such an arrangement may enable the second user to access text messages from either fixed user device 220 or the second mobile user device 210. In some implementations, the second user may receive a text messaging session with the first user on fixed user device 220, and may continue the text messaging session on the second mobile user device 210. For example, the second user may begin the text messaging session while at home on fixed user device 220 and while the second mobile user device 210 is turned off. The second user may turn on the second mobile user device 210, and may leave the home with the second mobile user device 210. In this example, the second user may continue the text messaging session with the second mobile user device 210.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
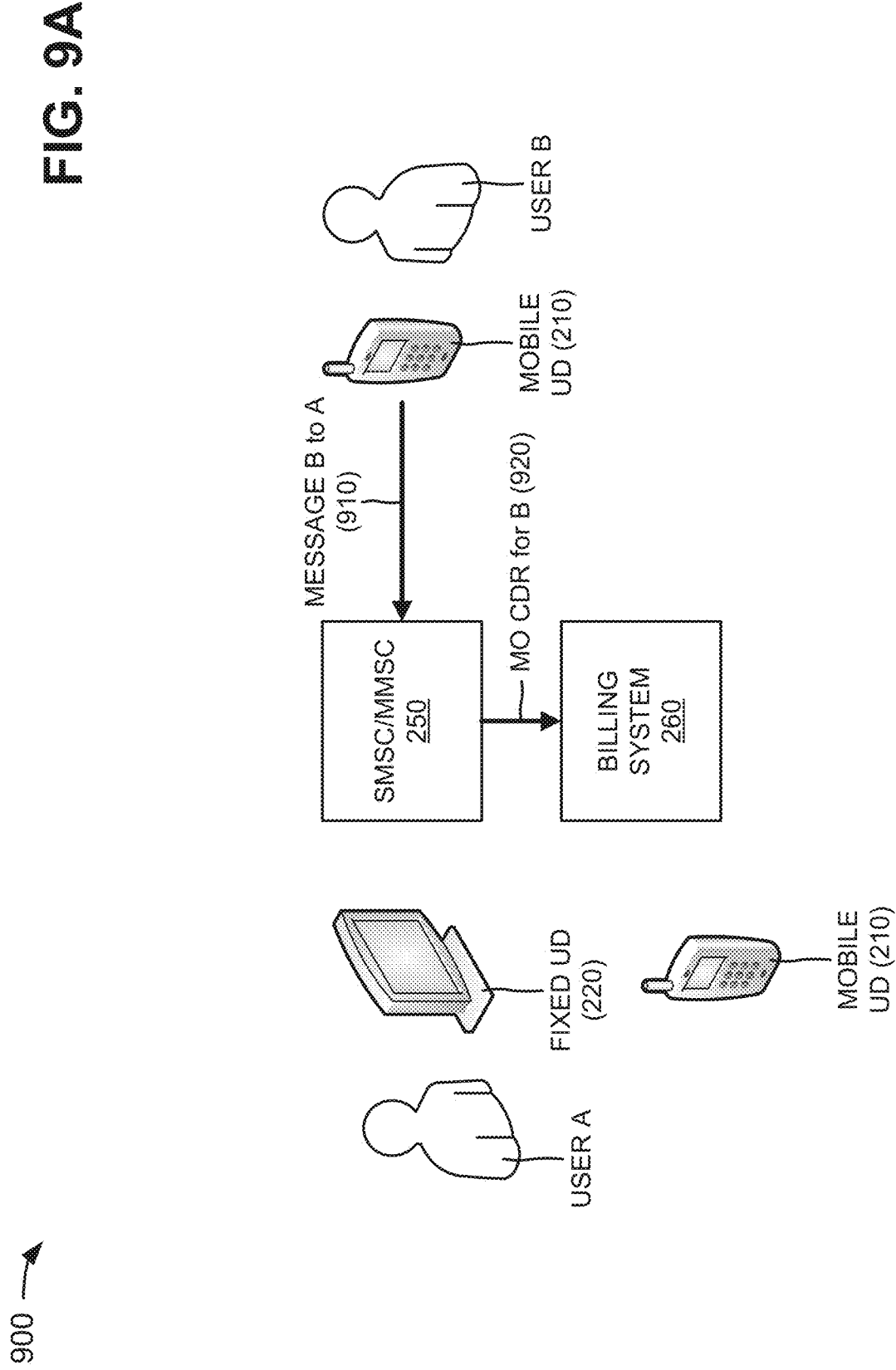

FIGS. 9A-9D are diagrams of an example 900 relating to example process 800 shown in FIG. 8. In example 900, assume that a first user (e.g., User A) is associated with fixed user device 220 and a first mobile user device 210, and that a second user (e.g., User B) is associated with a second mobile user device 210, as shown in FIG. 9A. Further, assume that User B utilizes the second mobile user device 210 and the messaging application to generate a message 910 addressed to User A. As shown in FIG. 9A, the second mobile user device 210 may provide message 910 to SMSC/MMSC 250, and SMSC/MMSC 250 may receive message 910.

SMSC/MMSC 250 may generate a charge record 920 for User B based on message 910, as further shown in FIG. 9A. In some implementations, charge record 920 may include a mobile originated (MO) call data record (CDR), for User B, which is based on the telephone number of the second mobile user device 210. As further shown in FIG. 9A, SMSC/MMSC 250 may provide charge record 920 to billing system 260. Billing system 260 may receive charge record 920, and may associate charge record 920 with an account of User B. In some implementations, the account may keep track of telecommunications services utilized by User B and costs associated with such telecommunications services. In some implementations, billing system 260 may generate, for User B, a bill based on charge record 920, and may provide the bill to User B.

Figure 9B:
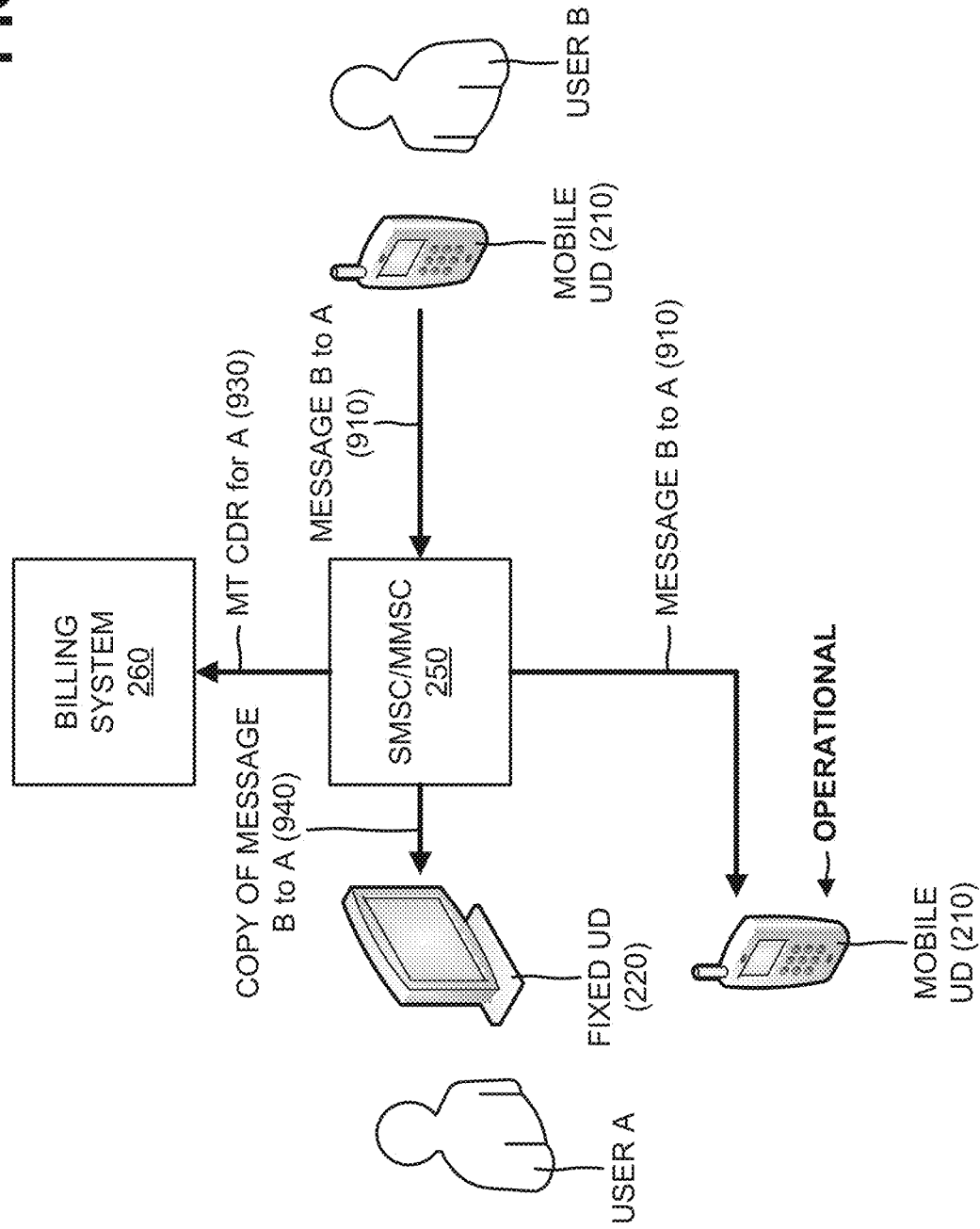

In some implementations, SMSC/MMSC 250 may determine whether the first mobile user device 210 is operational (e.g., turned on). If SMSC/MMSC 250 determines that the first mobile user device 210 is operational, SMSC/MMSC 250 may provide message 910 to the first mobile user device 210, as shown in FIG. 9B. As further shown in FIG. 9B, SMSC/MMSC 250 may generate a charge record 930 for User A based on message 910. In some implementations, charge record 930 may include a mobile terminated (MT) call data record (CDR), for User A, which is based on the telephone number of the first mobile user device 210. SMSC/MMSC 250 may provide charge record 930 to billing system 260, as shown in FIG. 9B. In some implementations, billing system 260 may receive charge record 930 from SMSC/MMSC 250, and may associate charge record 930 with an account of User A. In some implementations, the account may keep track of telecommunications services utilized by User A and costs associated with such telecommunications services. In some implementations, billing system 260 may generate, for User A, a bill based on charge record 930, and may provide the bill to User A. SMSC/MMSC 250 may generate a copy of message 910, as indicated by reference number 940 in FIG. 9B. In some implementations, SMSC/MMSC 250 may provide copy 940 to fixed user device 220, as further shown in FIG. 9B.

Figure 9C:
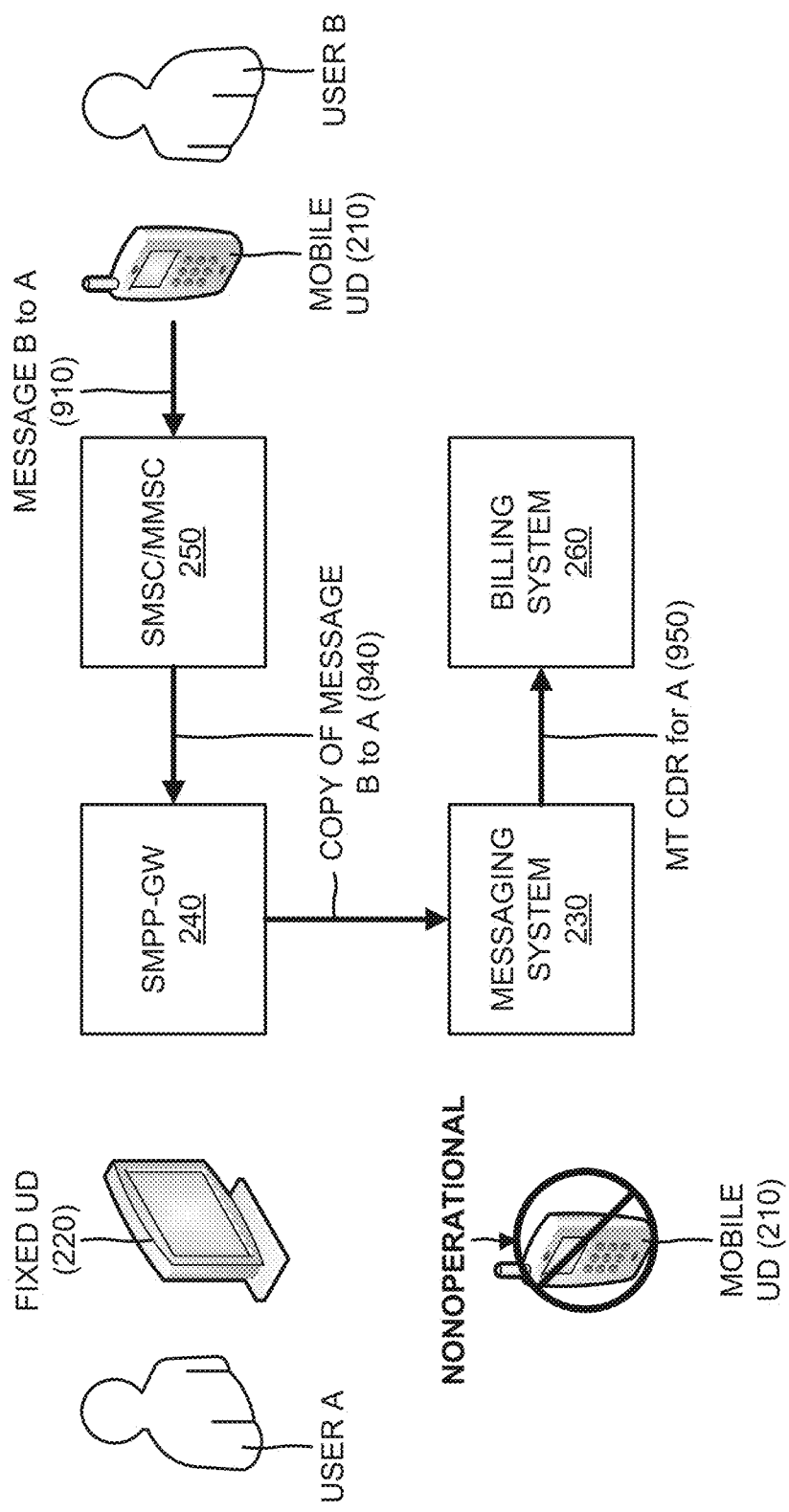

If SMSC/MMSC 250 determines that the first mobile user device 210 is nonoperational, SMSC/MMSC 250 may generate copy 940, as shown in FIG. 9C. In some implementations, SMSC/MMSC 250 may provide copy 940 to SMPP-GW 240, and SMPP-GW 240 may receive copy 940, as further shown in FIG. 9C. SMPP-GW 240 may convert copy 940 into a format understood by messaging system 230, and may provide the converted copy 940 to messaging system 230, as further shown in FIG. 9C. Messaging system 230 may generate a charge record 950 for User A based on copy 940. In some implementations, charge record 950 may include a mobile terminated (MT) call data record (CDR), for User A, which is based on the telephone number of the first mobile user device 210. Messaging system 230 may provide charge record 950 to billing system 260, as shown in FIG. 9C. In some implementations, billing system 260 may receive charge record 950 from messaging system 230, and may associate charge record 950 with an account of User A. In some implementations, the account may keep track of telecommunications services utilized by User A and costs associated with such telecommunications services. In some implementations, billing system 260 may generate, for User A, a bill based on charge record 950, and may provide the bill to User A.

Messaging system 230 may provide copy 940 to fixed user device 220, as shown in FIG. 9D. Fixed user device 220 may receive copy 940, and may display copy 940 to User A. In some implementations, messaging system 230 may store copy 940 so that User A may access copy 940, via the first mobile user device 210 or via fixed user device 220, at a later time. For example, when the first mobile user device 210 becomes operational, User A may utilize the first mobile user device 210 to access messaging system 230 and view copy 940 stored by messaging system 230. In another example, User A may utilize fixed user device 220 to access messaging system 230 and view copy 940 stored by messaging system 230.

As indicated above, FIGS. 9A-9D are provided merely as an example. Other examples are possible and may differ from what was described with regard to FIGS. 9A-9D.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A method, comprising:
 receiving, by a device of a messaging system, a text message,
  the text message being received from a fixed user device associated with a first user,
  the first user being associated with a first mobile user device, and
  the text message being destined for a second mobile user device associated with a second user;
 generating, by the device, a first charge record for the first user based on the text message and based on a telephone number associated with the first mobile user device, the first charge record enabling the first user to be charged for the text message received from the fixed user device;
providing, by the device, the first charge record to a billing system;
generating, by the device, a copy of the text message;
providing, by the device, the copy of the text message to the first mobile user device; and
forwarding, by the device, the text message toward the second mobile user device.

2. The method of claim 1, where the first charge record includes a mobile originated (MO) call data record (CDR) based on the telephone number associated with the first mobile user device.

3. The method of claim 1, where the second user utilizes the second mobile user device to generate a reply text message to the text message, and the method further comprises:
receiving a copy of the reply text message;
determining that the first mobile user device is nonoperational;
generating a second charge record for the first user based on the reply text message and based on the telephone number associated with the first mobile user device;
providing the second charge record to the billing system; and
providing the copy of the reply text message to the fixed user device.

4. The method of claim 3, where the second charge record includes a mobile terminated (MT) call data record (CDR) based on the telephone number associated with the first mobile user device.

5. The method of claim 1, further comprising:
receiving a request for a messaging application from the fixed user device or the first mobile user device,
the request for the messaging application being received before the text message is received from the fixed user device;
providing the messaging application to the fixed user device and the first mobile user device based on the request;
receiving, from the fixed user device, the telephone number associated with the first mobile user device;
providing an authentication mechanism to the first mobile user device via the telephone number associated with the first mobile user device;
providing, to the fixed user device, a user interface that requests the authentication mechanism; and
synchronizing the fixed user device and the first mobile user device for the messaging application, and based on the telephone number associated with the first mobile user device, when the authentication mechanism is received from the fixed user device via the user interface.

6. The method of claim 5, further comprising:
not synchronizing the fixed user device and the first mobile user device for the messaging application when the authentication mechanism is not received from the fixed user device via the user interface.

7. The method of claim 1, further comprising:
storing the copy of the text message;
receiving a request to access the copy of the text message from the first mobile user device; and
providing the stored copy of the text message to the first mobile user device based on the request.

8. A device, comprising:
one or more processors configured to:
receive a text message from a fixed user device associated with a first user,
the first user being associated with a first mobile user device, and
the text message being destined for a second mobile user device associated with a second user;
generate a first charge record for the first user based on the text message and based on a telephone number associated with the first mobile user device,
the first charge record enabling the first user to be charged for the text message received from the fixed user device;
provide the first charge record to a billing system;
generate a copy of the text message;
provide the copy of the text message to the first mobile user device; and
forward the text message toward the second mobile user device.

9. The device of claim 8, where the first charge record includes a mobile originated (MO) call data record (CDR) based on the telephone number associated with the first mobile user device.

10. The device of claim 8, where the second user utilizes the second mobile user device to generate a reply text message to the text message, and the one or more processors are configured to:
receive a copy of the reply text message;
determine that the first mobile user device is nonoperational;
generate a second charge record for the first user based on the reply text message and based on the telephone number associated with the first mobile user device;
provide the second charge record to the billing system; and
provide the copy of the reply text message to the fixed user device.

11. The device of claim 10, where the second charge record includes a mobile terminated (MT) call data record (CDR) based on the telephone number associated with the first mobile user device.

12. The device of claim 8, where the one or more processors are further configured to:
receive a request for a messaging application from the fixed user device or the first mobile user device,
the request for the messaging application being received before the text message is received from the fixed user device;
provide the messaging application to the fixed user device and the first mobile user device based on the request;
receive, from the fixed user device, the telephone number associated with the first mobile user device;
provide an authentication mechanism to the first mobile user device via the telephone number associated with the first mobile user device;
provide, to the fixed user device, a user interface that requests the authentication mechanism; and
associate the fixed user device with the first mobile user device for the messaging application, and based on the telephone number associated with the first mobile user device, when the authentication mechanism is received from the fixed user device via the user interface.

13. The device of claim 12, where the one or more processors are further configured to:
not associate the fixed user device with the first mobile user device for the messaging application when the authentication mechanism is not received from the fixed user device via the user interface.

14. The device of claim 8, where the one or more processors are further configured to:
store the copy of the text message;

receive a request to access the copy of the text message from the first mobile user device; and provide the stored copy of the text message to the first mobile user device based on the request.

15. A non-transitory computer-readable medium for storing instructions, the instructions comprising:
one or more instructions that, when executed by one or more processors of a device, cause the one or more processors to:
receive a text message from a fixed user device associated with a first user,
the first user being associated with a first mobile user device, and
the text message being destined for a second mobile user device associated with a second user;
generate a first charge record for the first user based on the text message and based on a telephone number associated with the first mobile user device,
the first charge record enabling the first user to be charged for the text message received from the fixed user device;
provide the first charge record to a billing system;
generate a copy of the text message;
provide the copy of the text message to the first mobile user device; and
forward the text message toward the second mobile user device.

16. The computer-readable medium of claim 15, where the first charge record includes a mobile originated (MO) call data record (CDR) based on the telephone number associated with the first mobile user device.

17. The computer-readable medium of claim 15, where the second user utilizes the second mobile user device to generate a reply text message to the text message, and the instructions further comprise:
one or more instructions that, when executed by the one or more processors, cause the one or more processors to:
receive a copy of the reply text message;
determine that the first mobile user device is nonoperational;
generate a second charge record for the first user based on the reply text message and based on the telephone number associated with the first mobile user device;
provide the second charge record to the billing system; and provide the copy of the reply text message to the fixed user device.

18. The computer-readable medium of claim 17, where the second charge record includes a mobile terminated (MT) call data record (CDR) based on the telephone number associated with the first mobile user device.

19. The computer-readable medium of claim 15, where the instructions further comprise:
one or more instructions that, when executed by the one or more processors, cause the one or more processors to:
receive a request for a messaging application from the fixed user device or the first mobile user device,
the request for the messaging application being received before the text message is received from the fixed user device;
provide the messaging application to the fixed user device and the first mobile user device based on the request;
receive, from the fixed user device, the telephone number associated with the first mobile user device;
provide an authentication mechanism to the first mobile user device via the telephone number associated with the first mobile user device;
provide, to the fixed user device, a user interface that requests the authentication mechanism;
associate the fixed user device with the first mobile user device for the messaging application, and based on the telephone number associated with the first mobile user device, when the authentication mechanism is received from the fixed user device via the user interface; and
not associate the fixed user device with the first mobile user device for the messaging application when the authentication mechanism is not received from the fixed user device via the user interface.

20. The computer-readable medium of claim 15, where the instructions further comprise:
one or more instructions that, when executed by the one or more processors, cause the one or more processors to:
store the copy of the text message;
receive a request to access the copy of the text message from the first mobile user device; and
provide the stored copy of the text message to the first mobile user device based on the request.

* * * * *